United States Patent
Prince et al.

(10) Patent No.: US 10,931,465 B2
(45) Date of Patent: Feb. 23, 2021

(54) SUPPORTING SECURE SESSIONS IN A CLOUD-BASED PROXY SERVICE

(71) Applicant: CLOUDFLARE, INC., San Francisco, CA (US)

(72) Inventors: Matthew Browning Prince, San Francisco, CA (US); Srikanth N. Rao, San Francisco, CA (US); Lee Hahn Holloway, Santa Cruz, CA (US); Ian Gerald Pye, Santa Cruz, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 196 days.

(21) Appl. No.: 16/356,304

(22) Filed: Mar. 18, 2019

(65) Prior Publication Data

US 2019/0215166 A1 Jul. 11, 2019

Related U.S. Application Data

(63) Continuation of application No. 14/692,397, filed on Apr. 21, 2015, now Pat. No. 10,237,078, which is a
(Continued)

(51) Int. Cl.
*H04L 9/32* (2006.01)
*H04L 29/06* (2006.01)
(Continued)

(52) U.S. Cl.
CPC ........ *H04L 9/3268* (2013.01); *H04L 63/0823* (2013.01); *H04L 63/0884* (2013.01);
(Continued)

(58) Field of Classification Search
CPC ... H04L 9/3268; H04L 67/28; H04L 63/0823; H04L 63/0884; H04L 63/0464;
(Continued)

(56) References Cited

U.S. PATENT DOCUMENTS

| 5,657,390 A | 8/1997 | Elgamal et al. |
| 6,128,279 A | 10/2000 | O'Neil et al. |

(Continued)

FOREIGN PATENT DOCUMENTS

| EP | 1533970 B1 | 8/2006 |
| WO | 2004036360 A2 | 4/2004 |
| WO | 2013/090894 A1 | 6/2013 |

OTHER PUBLICATIONS

Advisory Action from U.S. Appl. No. 13/193,574, dated Jun. 5, 2014, 13 pages.
(Continued)

*Primary Examiner* — Matthew T Henning
(74) *Attorney, Agent, or Firm* — Nicholson De Vos Webster & Elliott LLP

(57) ABSTRACT

A proxy server in a cloud-based proxy service receives a secure session request from a client device as a result of a Domain Name System (DNS) request for a domain resolving to the proxy server. The proxy server participates in a secure session negotiation with the client device including transmitting a digital certificate to the client device that is bound to domain and multiple other domains. The proxy server receives an encrypted request from the client device for an action to be performed on a resource that is hosted at an origin server corresponding to the domain. The proxy server decrypts the request and participates in a secure session negotiation with the origin server including receiving a digital certificate from the origin server. The proxy server encrypts the decrypted request using the digital certificate from the origin server and transmits the encrypted request to the origin server.

19 Claims, 15 Drawing Sheets

Related U.S. Application Data continuation of application No. 13/193,574, filed on Jul. 28, 2011, now Pat. No. 9,015,469.

(51) Int. Cl.
*H04L 29/08* (2006.01)
*H04W 76/10* (2018.01)

(52) U.S. Cl.
CPC .......... *H04L 67/28* (2013.01); *H04L 63/0464* (2013.01); *H04L 63/166* (2013.01); *H04W 76/10* (2018.02)

(58) Field of Classification Search
CPC ..... H04L 63/166; H04L 9/3263–3268; H04W 76/10
USPC ........................................................ 713/175
See application file for complete search history.

(56) References Cited

U.S. PATENT DOCUMENTS

| | | |
|---|---|---|
| 6,442,687 B1 | 8/2002 | Savage |
| 6,785,542 B1 | 8/2004 | Blight et al. |
| 6,823,454 B1 | 11/2004 | Hind et al. |
| 6,976,176 B1 | 12/2005 | Schier |
| 7,096,352 B2 | 8/2006 | Kang et al. |
| 7,137,143 B2 | 11/2006 | Chawla et al. |
| 7,249,377 B1 | 7/2007 | Lita et al. |
| 7,454,457 B1 | 11/2008 | Lowery et al. |
| 7,543,146 B1 | 6/2009 | Karandikar et al. |
| 7,650,359 B2 | 1/2010 | Sato et al. |
| 7,673,331 B2 | 3/2010 | Kido et al. |
| 7,869,591 B1 | 1/2011 | Nagel et al. |
| 7,917,758 B2 | 3/2011 | Palekar et al. |
| 7,921,292 B1 | 4/2011 | Pauker et al. |
| 8,275,790 B2 | 9/2012 | Fredricksen et al. |
| 8,327,128 B1 | 12/2012 | Prince et al. |
| 8,332,625 B2 | 12/2012 | Fritzges et al. |
| 8,615,795 B2 | 12/2013 | Cottrell et al. |
| 8,700,892 B2 | 4/2014 | Bollay et al. |
| 8,732,461 B2 | 5/2014 | Fujii et al. |
| 8,738,902 B2 | 5/2014 | Yoo et al. |
| 8,782,774 B1 | 7/2014 | Pahl et al. |
| 8,966,267 B1 | 2/2015 | Pahl et al. |
| 8,996,873 B1 | 3/2015 | Pahl et al. |
| 9,015,469 B2 | 4/2015 | Prince et al. |
| 9,049,247 B2 | 6/2015 | Holloway et al. |
| 9,184,911 B2 | 11/2015 | Pahl et al. |
| 9,385,864 B2 | 7/2016 | Pahl et al. |
| 9,450,950 B2 | 9/2016 | Pahl et al. |
| 9,553,856 B2 | 1/2017 | Pahl et al. |
| 9,680,807 B2 | 6/2017 | Pahl et al. |
| 10,009,183 B2 | 6/2018 | Pahl et al. |
| 10,033,529 B2 | 7/2018 | Pahl et al. |
| 10,129,224 B2 | 11/2018 | Pahl et al. |
| 10,594,496 B2 | 3/2020 | Pahl et al. |
| 2002/0016911 A1 | 2/2002 | Chawla et al. |
| 2004/0015725 A1 | 1/2004 | Boneh et al. |
| 2004/0054712 A1 | 3/2004 | Andreev et al. |
| 2004/0111600 A1 | 6/2004 | Kaler et al. |
| 2004/0133688 A1 | 7/2004 | Takamatsu |
| 2004/0161110 A1 | 8/2004 | Kanai et al. |
| 2004/0210756 A1 | 10/2004 | Mowers et al. |
| 2004/0268142 A1* | 12/2004 | Karjala ................. H04L 63/062 726/15 |
| 2005/0188220 A1 | 8/2005 | Nilsson et al. |
| 2005/0216736 A1 | 9/2005 | Smith |
| 2005/0262357 A1 | 11/2005 | Araujo et al. |
| 2005/0273849 A1 | 12/2005 | Araujo et al. |
| 2005/0283443 A1 | 12/2005 | Hardt |
| 2005/0283614 A1 | 12/2005 | Hardt |
| 2005/0289084 A1 | 12/2005 | Thayer et al. |
| 2006/0005017 A1 | 1/2006 | Black et al. |
| 2006/0005237 A1 | 1/2006 | Kobata et al. |
| 2006/0005239 A1 | 1/2006 | Mondri et al. |
| 2006/0161644 A1 | 7/2006 | Adelman et al. |
| 2006/0212697 A1 | 9/2006 | Sato et al. |
| 2006/0294366 A1 | 12/2006 | Nadalin et al. |
| 2007/0060097 A1 | 3/2007 | Edge et al. |
| 2007/0074282 A1 | 3/2007 | Black et al. |
| 2007/0150418 A1 | 6/2007 | Ben-Menahem et al. |
| 2007/0157027 A1 | 7/2007 | Palekar et al. |
| 2007/0189279 A1 | 8/2007 | Thalanany et al. |
| 2008/0022043 A1 | 1/2008 | Adams et al. |
| 2008/0134311 A1 | 6/2008 | Medvinsky et al. |
| 2008/0189773 A1 | 8/2008 | Maiorano et al. |
| 2008/0263215 A1 | 10/2008 | Schnellbaecher |
| 2008/0306875 A1 | 12/2008 | Mardikar |
| 2009/0055284 A1 | 2/2009 | Takayama |
| 2009/0092247 A1 | 4/2009 | Kido et al. |
| 2009/0132806 A1 | 5/2009 | Blommaert et al. |
| 2009/0158040 A1 | 6/2009 | Chaudhary et al. |
| 2009/0232315 A1 | 9/2009 | Bandaram et al. |
| 2009/0307759 A1 | 12/2009 | Schnell et al. |
| 2009/0327116 A1 | 12/2009 | Cunningham et al. |
| 2009/0327696 A1 | 12/2009 | Hatlelid et al. |
| 2010/0017848 A1 | 1/2010 | Pomerantz |
| 2010/0111300 A1 | 5/2010 | Kido et al. |
| 2010/0223456 A1 | 9/2010 | Schneider |
| 2010/0274836 A1 | 10/2010 | Orentas et al. |
| 2011/0154019 A1 | 6/2011 | Wang |
| 2011/0179286 A1 | 7/2011 | Spalka et al. |
| 2011/0264905 A1 | 10/2011 | Ovsiannikov |
| 2012/0131329 A1 | 5/2012 | Liang et al. |
| 2012/0174196 A1 | 7/2012 | Bhogavilli et al. |
| 2012/0209942 A1 | 8/2012 | Zehavi et al. |
| 2012/0254622 A1 | 10/2012 | Kanungo |
| 2012/0311322 A1 | 12/2012 | Koyun et al. |
| 2013/0031356 A1 | 1/2013 | Prince et al. |
| 2013/0097687 A1 | 4/2013 | Storm |
| 2013/0124866 A1 | 5/2013 | Farrugia et al. |
| 2013/0156189 A1 | 6/2013 | Gero et al. |
| 2013/0305036 A1 | 11/2013 | Vos |
| 2014/0044265 A1 | 2/2014 | Kocher et al. |
| 2014/0098960 A1 | 4/2014 | Xu et al. |
| 2014/0259147 A1 | 9/2014 | L'Heureux et al. |
| 2015/0039890 A1 | 2/2015 | Khosravi et al. |
| 2015/0067338 A1 | 3/2015 | Gero et al. |
| 2016/0261411 A1 | 9/2016 | Yau et al. |

OTHER PUBLICATIONS

Advisory Action from U.S. Appl. No. 14/692,397, dated May 1, 2018, 3 pages.
RFC 3546: Blake-Wilson S., "Network Working Group, Transport Layer Security (TLS) Extensions," Request for Comments: 3546, 2003, pp. 1-29.
RFC 4366: Blake-Wilson S., "Network Working Group, Transport Layer Security (TLS) Extensions," Request for Comments: 4366, 2006, pp. 1-30.
Chen., et al., "Pretty-Bad-Proxy: An Overlooked Adversary in Browsers' HTTPS Deployments," IEEE—Computer Society, 2009, pp. 347-359.
Cooley., et al., "Secure Channel Establishment in Disadvantaged Networks," IEEE, 2010, pp. 32-38.
El Sawda., et al., "SIP Security Attacks and Solutions: A State-of-the-art Review," IEEE, 2006, pp. 3187-3191.
Final Office Action from U.S. Appl. No. 13/193,574 dated Mar. 27, 2014, 12 pages.
Final Office Action from U.S. Appl. No. 14/692,397 dated Dec. 2, 2016, 15 pages.
Final Office Action from U.S. Appl. No. 14/692,397, dated Dec. 5, 2017, 18 pages.
Final Office Action from U.S. Appl. No. 14/692,397 dated May 20, 2016, 18 pages.
Henk et al., "Controlled Disclosure of Context Information Across Ubiquitous Computing Domains," IEEE, 2008, pp. 98-105.
Non-Final Office Action from U.S. Appl. No. 13/193,574, dated Jul. 17, 2014, 11 pages.
Non-Final Office Action from U.S. Appl. No. 13/193,574, dated Nov. 25, 2013, 15 pages.

(56) References Cited

OTHER PUBLICATIONS

Non-Final Office Action from U.S. Appl. No. 13/251,023, dated Feb. 10, 2012, 15 pages.
Non-Final Office Action from U.S. Appl. No. 14/692,397, dated May 18, 2018, 19 pages.
Non-Final Office Action from U.S. Appl. No. 14/692,397, dated May 19, 2017, 15 pages.
Non-Final Office Action from U.S. Appl. No. 14/692,397, dated Sep. 15, 2015, 19 pages.
Notice of Allowance from U.S. Appl. No. 14/692,397, dated Nov. 14, 2018, 13 pages.
Notice of Allowance from U.S. Appl. No. 13/193,574, dated Dec. 22, 2014, 7 pages.
Notice of Allowance from U.S. Appl. No. 14/692,397, dated Jul. 6, 2018, 13 pages.
Notice of Allowance from U.S. Appl. No. 13/251,023, dated Aug. 2, 2012, 18 pages.
RFC 2818: Rescorla E., "Network Working Group, HTTP Over TLS," Request for Comments: 2818, 2000, pp. 1-7.
RFC 2246: Dierks T., "Network Working Group, The TLS Protocol Version 1.0," Request for Comments: 2246, 1999, 81 pages.
RFC 4346: Dierks T., "Network Working Group, The Transport Layer Security (TLS) Protocol Version 1.1," Request for Comments: 4346, 2006, 87 pages.
RFC 5246: Dierks T., "Network Working Group, The Transport Layer Security (TLS) Protocol Version 1.2," Request for Comments: 5246, 2008, 104 pages.
Bjorn Edstrom., et al., blog.bjm.se: Fun with the TLS handshake, Programming and stuff, 2012, 11 pages.
Communication pursuant to Article 94(3) EPC, EP App. No. 14759676.1, dated Aug. 21, 2019, 6 pages.
Communication pursuant to Article 94(3) EPC, EP App. No. 14759676.1, dated Jun. 8, 2020, 5 pages.
Corrected Notice of Allowance for U.S. Appl. No. 13/788,784, dated May 21, 2014, 13 pages.
Donenfeld, Jason A., "WireGuard: Next Generation Kernel Network Tunnel", Available Online <https://www.wireguard.com/papers/wireguard.pdf>, Jun. 30, 2018, pp. 1-20.
European Search Report and Search Opinion, EP App. No. 14759676.1, dated Jan. 13, 2017, 7 pages.
Final Office Action for U.S. Appl. No. 14/248,254, dated Dec. 10, 2014, 12 pages.
Final Office Action, U.S. Appl. No. 16/043,972, dated Feb. 10, 2020, 12 pages.
Freier A., et al., "The Secure Sockets Layer (SSL) Protocol Version 3.0," Internet Engineering Task Force (IETF), Request for Comments: 6101, 2011, 67 pages.
International Preliminary Report on Patentability for Application No. PCT/US14/21434, dated Sep. 17, 2015, 8 pages.
International Search Report and Written Opinion for Application No. PCT/US14/21434, dated Apr. 14, 2014, 10 pages.
Jager et al., "On the Security of TLS-DHE in the Standard Model," CRYPTO 2012, LNCS 7417, International Association for Cryptologic Research, 2012, pp. 273-293.
Non Final Office Action for U.S. Appl. No. 14/248,254, dated Jul. 8, 2014, 11 pages.
Non Final Office Action for U.S. Appl. No. 14/937,805, dated May 6, 2016, 36 pages.
Non-Final OA for U.S. Appl. No. 14/315,241, Jul. 28, 2015, 16 pages.
Non-Final Office Action for U.S. Appl. No. 13/788,784, dated Jul. 11, 2013, 13 pages.
Non-Final Office Action for U.S. Appl. No. 13/788,784, dated Nov. 25, 2013, 12 pages.
Non-Final Office Action for U.S. Appl. No. 14/630,585, dated Sep. 30, 2015, 8 pages.
Non-Final Office Action from U.S. Appl. No. 15/202,371, dated Sep. 13, 2017, 12 pages.
Non-Final Office Action from U.S. Appl. No. 15/202,371, dated Sep. 21, 2016, 17 pages.
Non-Final Office Action from U.S. Appl. No. 15/413,187, dated Aug. 4, 2017, 12 pages.
Non-Final office action from U.S. Appl. No. 16/043,972, dated Aug. 28, 2019, 21 pages.
Non-Final Office Action, U.S. Appl. No. 16/188,244, dated Dec. 19, 2019, 27 pages.
Notice of Allowability, U.S. Appl. No. 16/159,437, dated Jun. 2, 2020, 8 pages.
Notice of Allowance for U.S. Appl. No. 13/788,784, dated Feb. 18, 2014, 12 pages.
Notice of Allowance for U.S. Appl. No. 14/248,253, dated Jul. 14, 2014, 21 pages.
Notice of Allowance for U.S. Appl. No. 14/248,253, dated Oct. 30, 2014, 8 pages.
Notice of Allowance for U.S. Appl. No. 14/248,254, dated Jul. 6, 2015, 09 pages.
Notice of Allowance for U.S. Appl. No. 14/248,256, dated Jun. 23, 2014, 11 pages.
Notice of Allowance for U.S. Appl. No. 14/315,241, dated Jan. 22, 2016, 20 pages.
Notice of Allowance for U.S. Appl. No. 14/630,585, dated Mar. 2, 2016, 12 pages.
Notice of Allowance from U.S. Appl. No. 14/315,241, dated Sep. 23, 2016, 16 pages.
Notice of Allowance from U.S. Appl. No. 14/675,385, dated May 18, 2016, 29 pages.
Notice of Allowance from U.S. Appl. No. 14/937,805, dated Aug. 24, 2016, 7 pages.
Notice of Allowance from U.S. Appl. No. 14/937,805, dated Feb. 15, 2017, 12 pages.
Notice of Allowance from U.S. Appl. No. 15/202,371, dated Apr. 11, 2017, 16 pages.
Notice of Allowance from U.S. Appl. No. 15/202,371, dated Mar. 27, 2018, 14 pages.
Notice of Allowance from U.S. Appl. No. 15/271,190, dated Feb. 27, 2018, 14 pages.
Notice of Allowance from U.S. Appl. No. 15/271,190, dated Oct. 23, 2017, 15 pages.
Notice of Allowance from U.S. Appl. No. 15/413,187, dated Jul. 16, 2018, 24 pages.
Notice of Allowance, U.S. Appl. No. 16/159,437, dated Dec. 31, 2019, 10 pages.
Notice of Allowance, U.S. Appl. No. 14/248,256, dated Oct. 8, 2014, 11 pages.
Notice of Allowance, U.S. Appl. No. 16/019,109, dated Nov. 12, 2019, 19 pages.
Notice of Allowance, U.S. Appl. No. 16/188,244, dated May 20, 2020, 9 pages.
Office Action, EP App. No. 14759676.1, dated Sep. 12, 2018, 5 pages.
Requirement for Restriction/Election from U.S. Appl. No. 15/413,187, dated Jan. 26, 2018, 9 pages.
Supplemental Notice of Allowance for U.S. Appl. No. 14/248,253, dated Feb. 18, 2015, 06 pages.
WireGuard, "Protocol & Cryptography", Available Online at <https://www.wireguard.com/protocol/>, Retrieved on Mar. 11, 2020, pp. 1-8.
Wu, Peter, "Analysis of the WireGuard protocol", Master's Thesis, Analysis of the WireGuard protocol, Eindhoven University of Technology, Jun. 17, 2019, 89 pages.

\* cited by examiner

SUPPORTING SECURE SESSIONS IN A CLOUD-BASED PROXY SERVICE

CROSS-REFERENCE TO RELATED APPLICATIONS

This application is a continuation of application Ser. No. 14/692,397, filed Apr. 21, 2015 which is a continuation of application Ser. No. 13/193,574, filed Jul. 28, 2011, now U.S. Pat. No. 9,015,469 which is hereby incorporated by reference.

FIELD

Embodiments of the invention relate to the field of secure network communications; and more specifically, to supporting secure sessions (e.g., SSL (Secure Sockets Layer), TLS (Transport Layer Security)) in a cloud-based proxy service.

BACKGROUND

SSL (Secure Sockets Layer) and TLS (Transport Layer Security), which is the successor to SSL, provide secure network connections. SSL and/or TLS are commonly used during web browsing (e.g., using HTTPS), email, and other Internet applications. An SSL or TLS client and server negotiate a set of parameters to establish a secure session in a process called a handshake. During the handshake process, the client connects to the SSL/TLS server requesting a secure session and provides cryptographic information including the version and the type of cryptographic algorithms supported by the client. The SSL/TLS server chooses one of the cryptographic algorithms and responds accordingly to the client. The SSL/TLS server also includes its digital certificate. The digital certificate typically includes the server name, a public key associated with the server, the identification and signature of the Certificate Authority (CA) that issued the certificate (the CA may be a trusted third party or may be the domain owner), and other information. The client may contact the CA to confirm the validity of the certificate before proceeding. If the client is not able to confirm validity of the certificate, it may generate a warning to the user and the user may be allowed to choose whether to proceed. The client sends a message to the server that includes a random number used to generate the symmetric encryption keys and the MAC (message authentication code) keys, which is encrypted with the public key of the server. The server responds with a finish message and the SSL handshake ends, at which point encrypted data can be exchanged between the client and the server.

Virtual hosting is a technique where multiple websites (multiple domains) are hosted on a single server. Name-based virtual hosting is a technique where multiple domains share the same IP address. ISPs (Internet Service Providers) that provide hosting capabilities for relatively small websites commonly use virtual hosting as a way to share the cost of resources. Virtual hosting is also commonly used in data centers. In name-based virtual hosting, in the case of an HTTP request, the server determines which virtual host (which website) to send a request to based on the Host header field in the request. In traditional SSL, the handshake procedure (where the server transmits its certificate to the host) occurs prior to the HTTP request. Thus, in traditional SSL, during the handshake procedure, the server does not know the destination host. This causes the server to employ a separate IP address for each virtual host that is configured with SSL. Since IP addresses are an increasingly limited resource (especially IPv4 addresses), having a separate IP address for each virtual host does not scale well and is amplified in a cloud environment across multiple data centers.

TLS, which is the successor to SSL, supports an extension to the handshake procedure called Server Name Indication (SNI). SNI is described in RFC 3546, June 2003. SNI allows the client to transmit the destination host name during the handshake procedure. This allows the server to determine the proper certificate to send to the client. If SNI is used, a server may use name-based virtual hosting without having an IP address for each virtual host and the appropriate certificate can be returned depending on the indicated host. SNI, however, is not supported by all browsers and/or operating systems. As a result, many servers do not support SSL and name-based virtual hosting.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
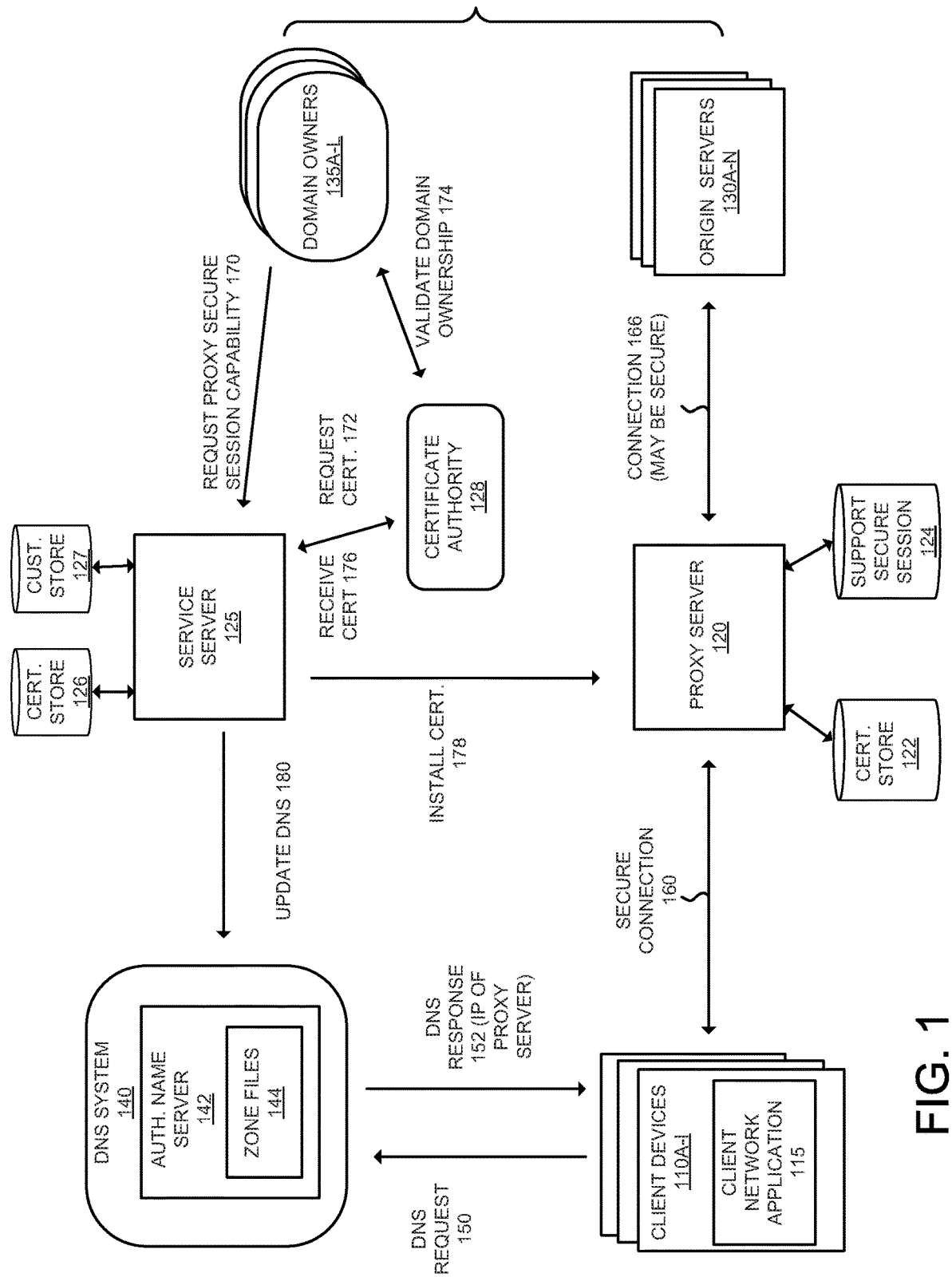
FIG. 1 illustrates an exemplary system for supporting secure sessions in a cloud based proxy service according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and apparatus for supporting secure sessions in a cloud-based proxy service is described. The cloud-based proxy service is available over the Internet and does not require customers (e.g., owners of a domain and/or personnel working on behalf of a domain owner) to install hardware or software to support secure session capability (at least from the client device to the proxy network). A proxy server of the service receives requests from client devices for secure sessions. For example, the proxy server receives a request for a secure session from a client device responsive to a client network application (e.g., a web browser) on the device visiting a website with a URL that begins with HTTPS (e.g., https://example.com). By way of specific example, the request is an SSL or a TLS client-hello message. In one embodiment, the proxy server receives the request as a result of a DNS (Domain Name System) request for the domain (e.g., example.com) resolving to the proxy server. Multiple domains, which may be owned by different domain owners, may resolve to the same proxy server.

The initial request for a secure session may or may not include the Server Name Indication (SNI) extension with the destination host name depending on the capabilities of the client network application (e.g., the web browser) and/or operating system of the client device. The proxy server negotiates a secure session with the requesting client device including transmitting a digital certificate to the client device that includes the server name (e.g., example.com), a public key, the identification and signature of the Certificate Authority (CA) that issued the certificate, and other information (e.g., time the certificate if valid, etc.). The certificate may also include a set of one or more other domains that may or may not be owned by the same domain owner that owns the requested domain. For example, the certificate may include a number of domains in the Subject Alternate Name (SAN) extension of the certificate.

After successfully negotiating a secure session, the client transmits an encrypted request to the proxy server (e.g., an HTTPS request). The proxy server decrypts the request to determine the destination host. The proxy server then determines whether that destination host (e.g., the origin server that corresponds with example.com) supports a secure session. For example, the proxy server accesses a database that indicates whether the destination host historically supports a secure session.

If the destination host historically supports a secure session or it is unclear whether the destination host supports a secure session, the proxy server attempts to establish a secure session with the destination host. For example, the proxy server transmits an SSL/TLS client-hello message to the proxy server identified in the decrypted HTTPs request. In one embodiment, this client-hello message includes the SNI extension that indicates the destination host name. Including the SNI extension in the client-hello message (which identifies the destination host) allows a hosting provider to implement name-based virtual hosting (multiple websites can share the same IP address) and return the appropriate certificate for that host. The origin server returns the appropriate certificate for the destination (e.g., in the SSL/TLS server-hello message) and the secure session is established (assuming that the origin server supports secure sessions). The proxy server then transmits an encrypted request (encrypted with the certificate received from the origin server) to the origin server.

If the destination host does not support a secure session (e.g., the domain owner of the destination has not established secure session capability to the origin server), then in one embodiment the proxy server transmits the request unencrypted to the proxy server. Thus in this situation, the connection between the client device and the proxy server is protected by a secure session (the communication will be encrypted) but the connection between the proxy server and the origin server is not protected by a secure session (the communication will be unencrypted).

FIG. 1 illustrates an exemplary system for supporting secure sessions in a cloud-based proxy service in accordance with one embodiment of the invention. The domain owners 135A-L own domains that are hosted on the origin servers 130A-N. The domain owners 135A-L may or may not own or control the origin servers 130A-N. For example, a domain owner 135 may contract with a hosting provider that owns an origin server 130 that hosts at least some of the content of the domain of the domain owner 135. The domains owned by the domain owners 135A-L point to the proxy server 120. That is, a DNS query for any of those domains resolve to the proxy server(s) 120.

The service server 125, operated by the service, provides a set of tools and interfaces for the domain owners 135A-L and is accessible over the Internet. For example, the service server 125, among other things, allows the domain owners 135A-L to register for the service. The cloud-based proxy service may provide, among other things, protection against Internet-based threats (e.g., proactively stopping botnets, cleaning viruses, trojans, and worms, etc.) and performance services for customers (e.g., acting as a node in a content delivery network (CDN) and dynamically caching customer's files closer to visitors, page acceleration, etc.). In some embodiments, customers provision the service through DNS. For example, DNS record(s) of a customer are changed such that DNS records of hostnames point to an IP address of a proxy server instead of the origin server. In some embodiments, the authoritative name server of the customer's domain is changed to an authoritative name server of the service and/or individual DNS records are changed to point to the proxy server (or point to other domain(s) that point to a proxy server of the service). For example, the customers may change their DNS records to point to a CNAME record that points to a proxy server of the service. In one embodiment, customers may use the service server 125 to change their authoritative name server to the authoritative name server 142 and/or change their zone file records to have their domain point to the proxy server 120. As will be described in greater detail later herein, the service server 125 also allows the domain owners 135A-L to establish secure session capability for traffic between client devices and the proxy server 120 as well as manages the secure session certificates.

The DNS system 140 is used to refer to the DNS system as a whole and includes multiple DNS servers to resolve DNS requests. As illustrated, the DNS system 140 includes the authoritative name server 142, which is an authoritative name server for the service. The authoritative name server 142 may be the authoritative name server for the domains hosted at the origin servers 130A-N. It should be understood that the DNS system 140 may include more DNS servers (e.g., preferred domain servers, top-level domain name servers, or other domain servers) than illustrated. It should also be understood that there may be multiple authoritative web servers for the service and they may be geographically distributed.

The client devices 110A-I are computing devices that are capable of accessing network resources (e.g., laptops, workstations, smartphones, palm tops, mobile phones, tablets, gaming systems, set-top boxes, etc.). Each of the client devices 110A-I include a client network application 115 (e.g., web browser, FTP client, SSH client, Telnet client, etc.), which is capable of accessing network resources. Users at the client devices 110A-I request network resources (e.g., HTML pages, images, word processing documents, PDF files, movie files, music files, or other computer files) through the client network application.

The origin servers 130A-N are computing devices that serve network resources (e.g., HTML pages, images, word processing documents, PDF files, movie files, music files, or other computer files). The origin servers 130A-N respond to requests for network resources (e.g., from an HTTP request, FTP request, telnet request, etc.). Although not illustrated in FIG. 1, it should be understood that the network resources of the origin servers 130A-N may be stored separately from the device that responds to the requests. In addition, some of the origin servers 130A-N may host multiple ones of the domains owned by the domain owners 135A-L. For example, a single origin server 130 may host multiple domains owned by the same domain owner or different domain owners through use of virtual hosting. In one embodiment, the virtual hosting is name-based virtual hosting where multiple websites (domains), which may or may not be owned or operated by the same domain owner, are hosted on the same IP address.

The proxy server 120 is a computing device that is situated between the client devices 110A-I and the origin servers 130A-N. Certain network traffic between the client devices 110A-I and the origin servers 130A-N pass through the proxy server 120. For example, requests for resources (e.g., HTTP, HTTPS, etc.) at the domains hosted by the origin servers 130A-N are directed to the proxy server 120 as a result of a DNS request 150 for those domains resolving 152 to the proxy server 120. As another example, responses (e.g., HTTP responses)

The proxy server 120 negotiates secure sessions with the client devices 110A-I responsive to the client devices requesting a secure session. For example, the proxy server 120 receives a request for a secure session from a client device 120 response to a client network application 115 visiting a website with a URL that begins with HTTPS. The request is an SSL or TLS client-hello message. In one embodiment, the SSL or TLS client-hello message is transmitted to the proxy server 120 as a result of a DNS request for the requested domain resolving to the proxy server 120. The specific type of client-hello message is dependent on the capabilities of the client network application 115 and/or the operating system running on the client device 110. For example, some client-hello messages may include the SNI extension while others may not, depending on the capabilities of the client network application 115 and/or the operating system running on the client device 110. After a client device 110 and the proxy server 120 establish a secure session, traffic between them can be sent encrypted on the secure connection 160. In some embodiments, the proxy server 120 is also capable of receiving traffic from the client devices 110A-I that is not over a secure connection (e.g., regular HTTP traffic).

The proxy server 120 may also negotiate a secure session with an origin server depending on whether the origin server supports secure sessions. For example, the proxy server 120 receives an encrypted request (e.g., an HTTPS request) from a client device and decrypts that request to determine the destination host name. The proxy server 120 accesses the support secure session store 124 to determine whether the origin server 130 corresponding to the destination host name has previously supported secure sessions. The support secure session store 124 indicates whether the origin servers historically support secure sessions. In one embodiment, the support secure session store 124 is populated by periodically checking whether the origin server supports secure sessions by attempting to establish a secure session and recording the outcome. The secure session store 124 may also indicate the type of secure session supported by the origin server (e.g., SSL, TLS, versions of SSL or TLS, etc.).

Assuming that the origin server 130 supports secure sessions, the proxy server 120 transmits a request for a secure session to the origin server 130. For example, the proxy server 120 transmits an SSL or TLS client-hello message. If the origin server 130 supports TLS, the proxy server 120 transmits a TLS client-hello message with the SNI extension to identify the destination host name. The origin server returns the appropriate certificate for the destination (e.g., in a TLS server-hello message) and the secure session is established using that certificate. Traffic (e.g., responses and requests) is then encrypted over the connection 166 between the proxy server 120 and the origin server 130.

In one embodiment, if the origin server 130 does not support secure sessions, the proxy server 120 transmits the decrypted request to the origin server 130 unencrypted.

The Certificate Authority (CA) 128 is a trusted entity that issues digital certificates for secure sessions. In one embodiment the CA 128 issues digital certificates for the secure connection 160 for the domains owned by the domain owners 135A-L. The CA 128 may also issue digital certificates for the connection 166.

Registering for Secure Sessions in a Cloud-Based Proxy Service

In one embodiment, the domain owners 135A-L register 170 for secure session capability in the cloud-based proxy service of FIG. 1 through use of the service server 125. For example, the service server 125 provides an interface that allows the domain owners 135A-L to request SSL to be established for their domain(s) (or one or more subdomains). In one embodiment, a customer (e.g., domain owner and/or personnel working on behalf of the domain owner) uses the service server 125 to select one or more of its fully-qualified domain names (FQDNs) to establish secure session capability.

In one embodiment, during registration of the cloud-based proxy service for a particular domain, the service server 125 tests that domain and/or one or more subdomains (or cause subdomains to be tested) in order to determine if they have secure session capability enabled. The goal is to ensure that subdomains that have secure session capability are not proxied through a proxy server until after a certificate is installed. If this is not done, then the secure session connections may fail. In one embodiment the test can be done on all subdomains or only on those subdomains designated to be proxied through the system after registration for the cloud-based service is complete.

In one embodiment, the test includes the service server 125 (or other server of the service) attempting to open a web connection and establish a session over HTTPS (typically port 443) for each tested subdomain. These tests may be done in sequence or in parallel. If a successful HTTPS connection is established, then the service server 125 records information about the certificate (e.g., information about who the certificate was issued to, certificate provider, certificate expiration date, certificate issuance date, certificate encryption bit level, any subject alternate names (SANs) in the certificate, etc.). The subdomain on which the successful HTTPS connection was established is marked as having secure session capability (e.g., in the customer store 127).

In one embodiment, for subdomains that have secure session capability, customers are prompted if they want to add a secure session certificate to the system. Customers may also choose to add secure session capability to subdomains that do not already have SSL enabled. In one embodiment, if customers opt to not install secure session capability and at least some of their subdomains are secure session enabled, then the service server 125 warns them that secure session connections for their subdomains may experience errors.

In one embodiment, if a customer chooses to register for secure session capability for one or more of its domains, the DNS records for those domains will continue to point to the origin server directly until the secure session certificate has been issued (e.g., by the Certificate Authority) and is installed and enabled on the proxy network. Once that has occurred, the DNS records for those domains will point to a proxy server rather than directly to the origin server.

Figure 2:
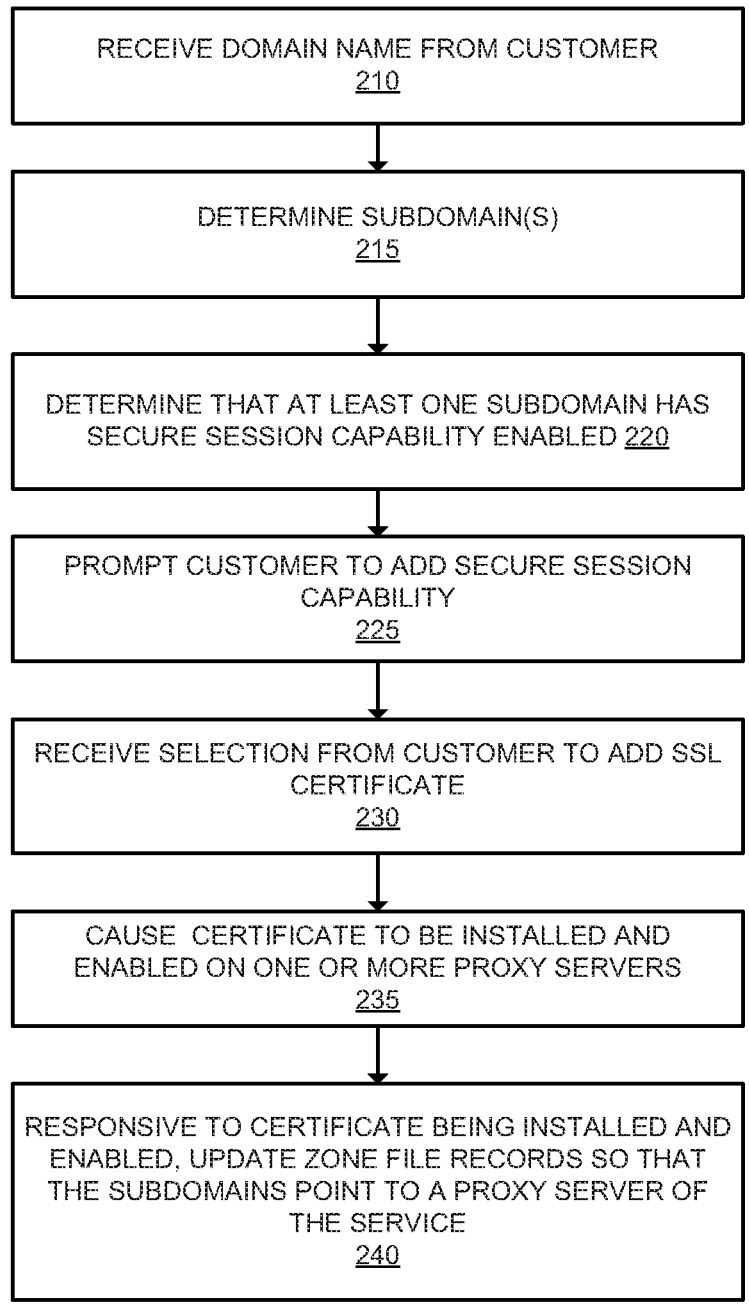
FIG. 2 is a flow diagram illustrating exemplary operations for registering for secure session capability according to one embodiment

FIG. 2 is a flow diagram illustrating exemplary operations for registering for secure session capability according to one embodiment. The operations of FIG. 2 will be described with reference to the service server 125; however it should be understood that the operations of FIG. 2 can be performed by embodiments other than those discussed with reference to the service server 125 and the service server 125 can perform operations different than those discussed with reference to the operations of FIG. 2.

At operation 210, the service server 125 receives the name of the domain (e.g., example.com) from a customer as part of registering for the cloud-based proxy service. Flow then moves to operation 215 and the service server 125 determines a number of subdomains for the domain. For example, the subdomains may be input by the customer and/or determined by the service server 125 by testing common subdomains (e.g., www, blog, mail, etc.).

Flow the moves to operation 220 and the service server 125 determines that at least one of the subdomains has secure session capability enabled outside of the proxy network (e.g., secure session capability on the connection 166). For example, the service server 125 attempts to open a web connection and establish a session over HTTPS for each of the subdomains to determine whether they are enabled with secure session capability.

Flow then moves to operation 225 and the service server 125 prompts the customer to add secure session capability for the connection between the client devices and the proxy network (e.g., connection 160) for the subdomains that have secure session capability enabled. The customer may also add secure session capability for the connection between the client devices and the proxy network for those subdomains that do not currently have secure session capability enabled. Flow then moves to operation 230 and the service server 125 receives a selection from the customer to add secure session capability to one or more subdomains. If the service server 125 does not receive a selection for a subdomain in which secure session capability is enabled outside of the proxy network, the service server 125 may warn the customer that not enabling secure session capability may cause errors.

Flow then moves to operation 235 and the service server 125 causes a certificate to be installed and enabled on one or more proxy servers 120. In one embodiment, the service server 125 prompts the customer to use their certificate installed for traffic directly to their origin server (e.g., the certificate used on the connection 166). If the customer does not have a certificate already installed or chooses not to use it, then the service server 125 causes one or more certificates to be generated for the customer. In one embodiment, the service server 125 may cause multiple domains, which may or may not belong to different domain owners, to be bound to the same digital certificate. For example, the certificate may include a number of domains in the Subject Alternate Name (SAN) extension of the certificate. The certificate(s) are installed and enabled on one or more proxy servers in the cloud-based proxy service.

Flow then moves to operation 240, where responsive to a certificate bound to the domain(s) of the customer being installed and enabled in the proxy network, the DNS records of the domain and/or subdomains are updated such that they point to a proxy server of the cloud-based proxy service.

In one embodiment, after receiving a request to establish secure session capability on a set of one or more particular domains (or subdomains), the service server 125 requests 172 a digital certificate on behalf of those domain(s) or subdomain(s) from the Certificate Authority 128 and if the domain owner is validated, receives a digital certificate 176 for those domain(s) or subdomain(s).

In another embodiment, responsive to a customer registering for secure service for its root domain, the service server 125 automatically requests 172 a digital certificate with two SAN entries for that root domain: one SAN entry for the root domain (e.g., example.com) and one SAN entry for a wildcard covering all subdomains for the root domain (e.g., *.example.com). In such an embodiment, the customer does not have to select each and every FQDN it wants to establish secure session capability for.

In one embodiment, the service server 125 causes multiple domains to be clustered in certificates based on a set of parameters. For example, the service server 125 may cause a FQDN that shares a root domain with another FQDN (e.g., www.example.com and blog.example.com) to be bound to the same digital certificate (these FQDNs that share a root domain may be owned by the same domain owner or different domain owners). As another example, the service server 125 may cause multiple different domains (e.g., www.example1.com and www.example2.com) that are owned and/or operated by the same domain owner to be bound to the same digital certificate. As yet another example, the service server 125 may cause domains to be clustered into certificates based on their content.

Figure 3:
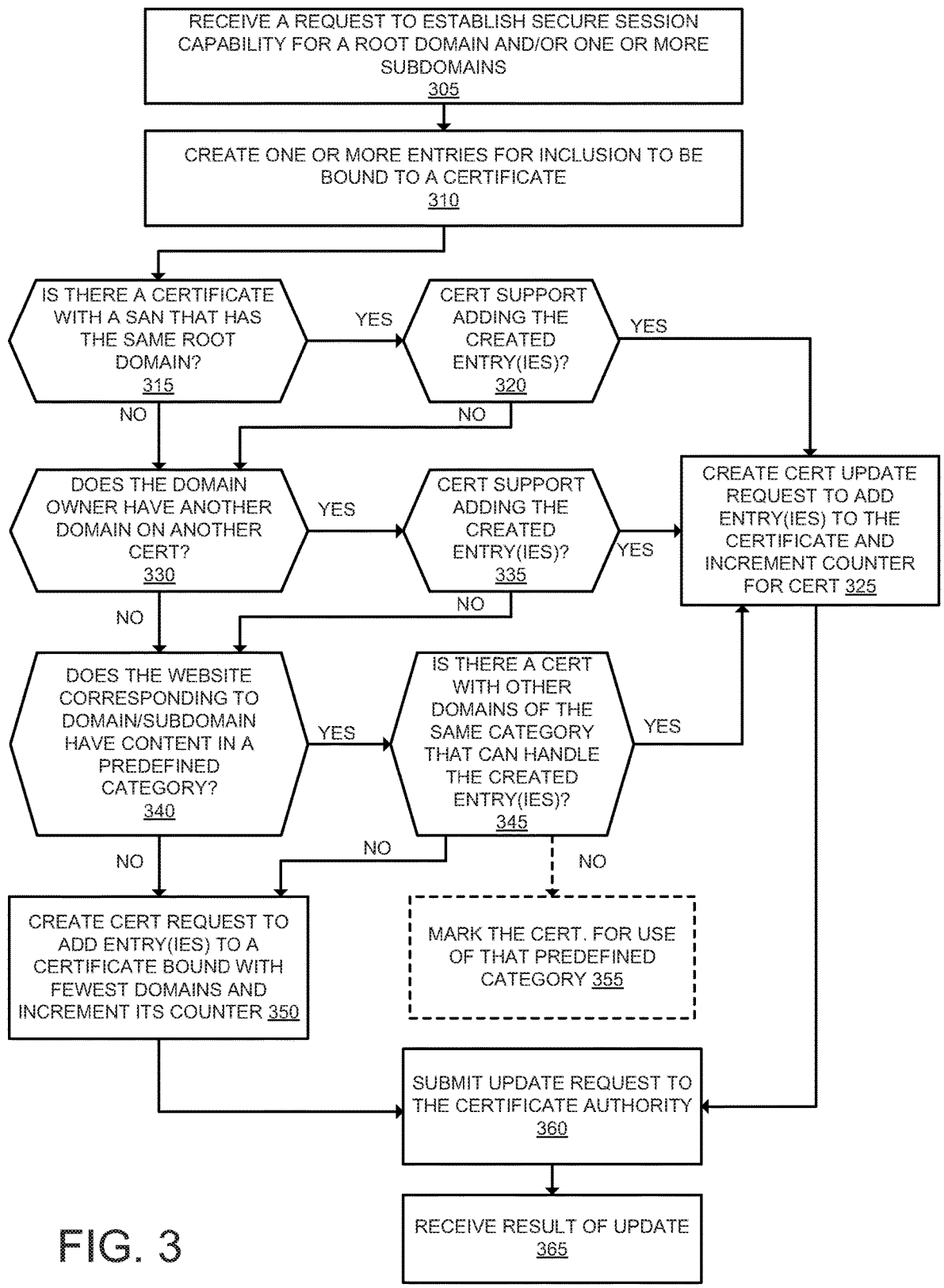
FIG. 3 is a flow diagram that illustrates exemplary operations for configuring secure session capability in a cloud-based proxy service including causing multiple domains to be clustered into a single digital certificate according to one embodiment.

FIG. 3 is a flow diagram that illustrates exemplary operations for configuring secure session capability in a cloud-based proxy service including causing multiple domains to be clustered into a single digital certificate according to one embodiment. The operations of FIG. 3 will be described as being performed by the service server 125; however it should be understood that one or more other devices may perform operations described with reference to FIG. 3, and the service server 125 may perform operations different than those discussed with reference to FIG. 3.

At operation 305, the service server 125 receives a request from a customer to establish secure session capability for a root domain and/or one or more subdomains. The request may specifically indicate multiple FQDNs that the customer wishes to establish secure session capability for (e.g., www.example.com; blog.example.com, mail.example.com, etc.) or may only indicate a single root domain or subdomain (e.g., example.com). In one embodiment, the customer has been validated as being able to request secure session capability for the domain through the service registration procedure. For example, in one embodiment, registering for the cloud-based proxy service requires that the customer change their name server to a particular name server (given by the service), which demonstrates that the customer has the authority to change DNS records. In another embodiment, during registration of the cloud-based proxy service, the service server 125 queries the customer to add a unique record to their existing DNS file. This record may be any valid DNS record type. In one example, a customer could add a TXT record with a unique string of characters. The system could check for the presence of this TXT record and, if the string of characters matched, designate the customer who was issued that string of characters in association with that domain as authoritative for the domain.

Next, at operation 310, the service server 125 creates one or more entries for inclusion in the SAN extension of a certificate. In one embodiment, responsive to receiving a request for a single root domain, the service server 125 creates at least two entries to be included as SANs in a certificate: one for the root domain (e.g., example.com) and one for a wildcard that covers all the subdomains of that root domain (e.g., *.example.com). Responsive to receiving a request for secure session capability that specifically indicates multiple FQDNs, the service server 125 creates an entry for each FQDN to be included as a SAN in a certificate.

Flow then moves to operation 315 and the service server 125 determines whether there is a certificate that is bound with a domain that has the same root domain as the requested domain/subdomain (e.g., www.example.com and blog.example.com share the same root domain of example.com). In one embodiment the service server 125 accesses the certificate store 126 for this determination. The certificate store 126 stores the certificates along with an attribute that indicates how many domains and subdomains are bound to the certificate. The service server 125 (or another device) limits the number of domains and subdomains that may be bound to the certificate to a configurable number (e.g., 40 domains and subdomains).

If there is a certificate that includes a domain that has the same root domain as the requested domain/subdomain, then flow moves to operation 320 where the service server 125 determines whether the capacity of that certificate would support adding the entry(ies) created in operation 310. For example, the service server 125 accesses the certificate store 126 to determine whether the certificate can support adding the created entry(ies). If the certificate can support adding the entry(ies), then flow moves to operation 325 and the service server 125 creates a certificate update request to add those entry(ies) to the certificate (e.g., to be included in the SAN extension) and updates the counter for the number of domains and subdomains that are bound to the certificate in the certificate store 126. Flow moves from operation 325 to operation 360. If the certificate cannot support adding the entry(ies), then flow moves to operation 330. In addition, if a certificate does not exist that includes a domain that has the same root domain, then flow moves from operation 315 to operation 330.

At operation 330, the service server 125 determines whether the domain owner has another domain or subdomain currently bound to a certificate. In one embodiment the service server 125 maintains the customer store 127, which stores customer (domain owner) information, including the name of the domains and/or subdomains that are configured with secure session capability for the cloud-based proxy service. In one embodiment the service server 125 accesses the customer store 127 to identify the name of the domain owner's domains and/or subdomains that have been configured with secure session capability and compares that list with the information in the certificate store 126. In another embodiment, the customer store 127 also indicates the certificate(s) (if any) that include a domain or subdomain of each domain owner, which is used by the service server 125 to determine whether the domain owner has another domain or subdomain currently bound to another certificate. If the domain owner has another domain or subdomain currently bound to another certificate, then flow moves to operation 335, otherwise flow moves to operation 340. At operation 335 the service server 125 determines whether that certificate can support adding the created entry(ies). If it can, then flow moves to operation 325 and the service server 125 creates a certificate update request to add the created entry(ies) to the certificate (e.g., to be included in the SAN extension of the certificate) and updates the counter for the number of domains and subdomains that are bound to the certificate in the certificate store 126. Flow moves from operation 325 to operation 360. If the certificate cannot support adding the created entry(ies), however, then flow moves to operation 340.

At operation 340, the service server 125 determines whether the website corresponding to the domain or subdomain has content that is categorized in a predefined category. By way of example, the predefined category may include adult content. Other types of categories are also possible (e.g., religious categories, commercial categories, news/ sports categories, etc.). In one embodiment, the customer store 127 indicates, for each domain or subdomain of a domain owner, the content of that domain or subdomain. In another embodiment, the customer store 127 indicates for each domain or subdomain of a domain owner whether the content of that subdomain or domain is flagged such that it will not be clustered with other domains/subdomains that are not owned by the same domain owner. In another embodiment, the certificate store 126 includes an attribute for each certificate that indicates a category type. Certain domain owners may prefer and/or request to not have their domains/subdomains be bound to the same certificate as other types of domains (e.g., a religious website may prefer not to be bound to the same certificate as an adult website) and clustering those domains that have a predefined content category helps meet that preference and/or request.

If the website corresponding to the domain or subdomain has content that is categorized in a predefined category, then flow moves to operation 345, otherwise flow moves to operation 350. At operation 345, the service server 125 determines whether there is a certificate that is bound with other domains of the same category that can support adding the created entry(ies). For example, the service server 125 accesses the customer store 127 and/or the certificate store 126 to determine whether there is another certificate that is bound with a domain of the same category and can support adding the created entries. If there is, then flow moves to operation 325 and the service server 125 creates a certificate update request to add the created entry(ies) to the certificate (e.g., to be included in the SAN extension) and the counter for the number of domains and subdomains that are bound to the certificate is updated in the certificate store 126. Flow moves from operation 325 to operation 360. If there is not, then in one embodiment flow moves to operation 355 while in another embodiment flow moves to operation 350. At operation 355, the certificate is marked for use for that predefined category (e.g., in the certificate store 126) such that future domains of the same category are able to be clustered into that certificate.

At operation 350, the service server 125 creates a certificate request to add the created entry(ies) to the certificate that is bound with the fewest domains and increments the counter for that domain in the certificate store 126. For example, the service server 125 accesses the certificate store 126 to determine which certificate has the lowest count and updates that certificate. Flow then moves to operation 360 where the service server 125 submits the update request (e.g., a SAN update request) to the Certificate Authority 128.

In one embodiment, the service server 125 tracks the status of the certificate requests. For example, a certificate request may be pending while waiting for validation that the entity making the request is authorized. In one embodiment, the service server 125 creates a record in the customer store 127 that indicates the validation status (e.g., pending, validated) of each domain owner.

Flow moves from operation 360 to operation 365 where the service server 125 receives the result of the update request from the Certificate Authority 128. Assuming that the update request was successful, the service server 125 will receive an updated certificate that includes the addition of the domain or subdomain in the SAN extension of the certificate. The service server 125 then causes the digital certificate to be installed.

While FIG. 3 shows a particular order of operations performed, it should be understood that such order is exemplary. Alternative embodiments may perform the operations in a different order, omit certain operations, combine certain operations, etc. In addition, in some embodiments, the set of parameters further includes the status of a certificate (e.g., pending or issued). A certificate request may be pending while waiting for validation from the domain owners whose domain(s) are bound to that certificate. In one embodiment, if possible, the service server 125 selects a certificate that does not have any pending verifications when it makes a certificate request for the created entry(ies). For example, the domain owner may have multiple domains bound to multiple certificates. The service server 125 may select the certificate that does not have any pending verifications (or the certificate that has the fewest pending verifications) that can support adding the created entry(ies).

In one embodiment, in addition to creating a request for a digital certificate to include the root domain and/or subdomains of a customer, which may also be bound to other domains, the service server 125 automatically requests another digital certificate bound to that root domain and/or subdomains that will not be bound to other root domains and their corresponding subdomains. For example, consider the service server 125 receiving a request for secure session capability for the root domain example1.com. In response, the service server 125 may request the domain be bound to a first certificate that is also bound to other root domains and/or their subdomains (e.g., the certificate may be bound with example1.com; *.example.1.com; example2.com; *.example2.com; . . . exampleN.com; and *.exampleN.com) and request the domain be bound to a second certificate that will not be bound to other root domains or their corresponding subdomains (e.g., the certificate may only be bound with example1.com and *.example1.com). The first certificate, which may, and typically is, bound to other domains is referred herein as the primary certificate. The second certificate which is only bound to the root domain and/or its subdomain(s) is referred herein as the secondary certificate. The use of the secondary certificates will be described in greater detail later herein.

Typically each Certificate Authority has a procedure to validate whether the entity making the request (the domain owner) is an authorized entity for the certificate. As illustrated in FIG. 1, the Certificate Authority 128 validates the domain ownership at operation 174. Different certificate authorities may have different validation procedures, which may include interaction on behalf of the domain owners. For example, some Certificate Authorities may use an email validation system where an email is sent to one or more authorized addresses (e.g., an email listed in the WHOIS database for the domain, or other predefined email addresses (e.g., admin@example.com, administrator@example.com, hostmaster@example.com, postmaster@example.com, root@example.com, webmaster@example.com, and info@example.com)) that includes a link that when selected causes a token to be sent to the Certificate Authority or may be replied to in order to validate authenticity. As another example, the Certificate Authority may use a web page validation method where the Certificate Authority issues a unique code for the domain (or subdomain) and this code is then entered into a web page (either automatically by the service server 125 or by the customer) that is sent to the Certificate Authority for validating. As another example, the Certificate Authority may check whether the authoritative name server of the domain has been changed to a particular authoritative name server (the service server 125 may automatically change the authoritative name server of the domain or the customer may change the authoritative name server of the domain). As another example, the Certificate Authority may check for a particular subdomain of the root domain that includes a particular verification code (e.g., verifycode.example.com). The subdomain and content with the inserted verification code may be automatically created by the service server 125 or created by the customer. As yet another example, the Certificate Authority may check a TXT DNS record or some other DNS record for a particular verification code (the code may be entered by the domain owner or automatically entered by the service server 125). The Certificate Authority may also use other authentication techniques (e.g., placing a phone call, accessing public records databases, etc.).

Figure 4:
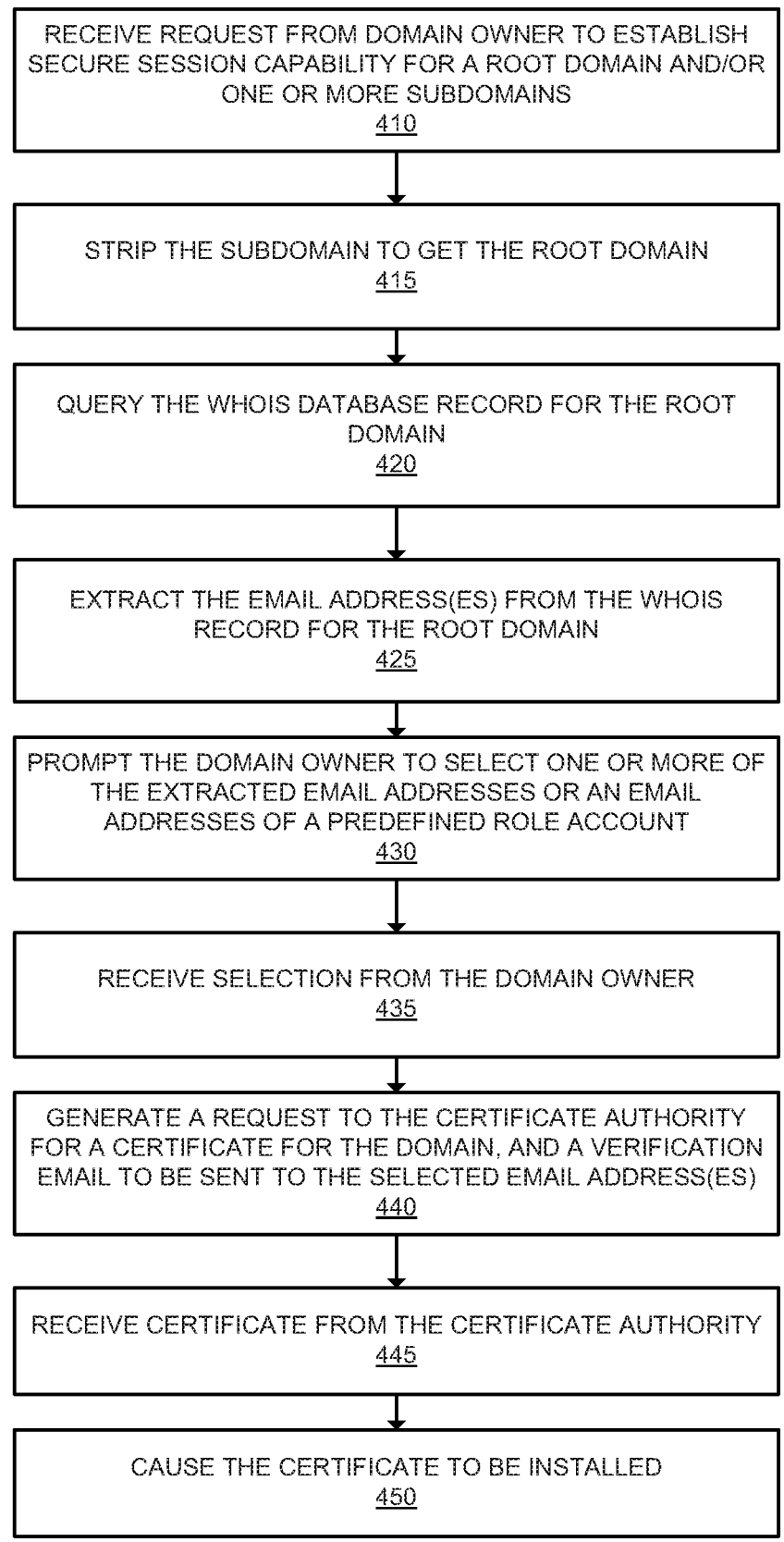
FIG. 4 is a flow diagram illustrating email validation for secure session registration according to one embodiment.

FIG. 4 is a flow diagram illustrating email validation according to one embodiment. The operations of FIG. 4 will be described as being performed by the service server 125, however it should be understood that one or more other devices may perform operations described with reference to FIG. 4, and the service server 125 may perform operations different than those discussed with reference to FIG. 4. The operations described with reference to FIG. 4 can be performed in conjunction with the operations described with reference to FIG. 3.

At operation 410, the service server 125 receives a request from a domain owner 135 to establish secure session capability for a root domain and/or one or more subdomains. Flow then moves to operation 415 where the service server 125 strips the subdomain (if a subdomain was requested) to obtain the root domain. Flow then moves to operation 420 and the service server 125 queries the WHOIS database for the record that corresponds with the root domain. The WHOIS database includes, among other things, contact information for the domain including one or more email addresses. The service server 125 then extracts the email address(es) from the WHOIS record for the root domain at operation 425.

Next, at operation 430, the service server 125 prompts the domain owner 135 to select one or more of the extracted email addresses or an email address of a predefined role account (e.g., admin@example.com, administrator@example.com, hostmaster@example.com, postmaster@example.com, root@example.com, webmaster@example.com, and info@example.com). Flow then moves to operation 435 and the service server 125 receives a selection from the domain owner 135 of one or more of the email addresses. Next, the service server 125 generates and transmits a request to the Certificate Authority 128 to issue a certificate for the root domain and/or one or more subdomains and send a verification email to the selected email address(es) at operation 440. In some embodiments, the request includes multiple entries associated with the domain as described in FIG. 3 (e.g., the created entry(ies) described in operation 310). By way of a specific example, the entries may include the root domain (e.g., example.com) and a wildcard covering all subdomains of the root domain (e.g., *.example.com).

Sometime after receiving the request, the Certificate Authority 128 transmits a verification email to the selected email address(es). In one embodiment, the verification email includes a link that, when selected, causes a token to be sent to the Certificate Authority. In another embodiment, the domain owner replies to the verification email in order to validate authenticity. The Certificate Authority may also take one or more additional authentication procedures prior to issuing the certificate.

In another embodiment, instead of prompting the domain owner to select email address(es) and receiving a selection from the domain owner, the service server 125 automatically requests the Certificate Authority 128 to issue a certificate for the domain and send a verification email to each of the extracted email addresses and/or email addresses of a predefined role account.

The domain owner 135 receives a verification email at least at one account (e.g., from the Certificate Authority). The domain owner 135 may also be notified of the pending verification email. For example, the service server 125 may cause an email, text message, phone call, or other message to be communicated with the domain owner 135 alerting the domain owner that a verification email is pending. In one embodiment, the verification email includes a link that when selected, causes a token to be transmitted to the Certificate Authority. In another embodiment, the verification email, when replied to, validates the authenticity of the domain owner. In one embodiment, after verifying a domain owner, the Certificate Authority transmits a message to the service server 125 that indicates that the domain owner has been verified.

Assuming that the domain owner is authenticated, the Certificate Authority generates a digital certificate bound to the requested entries (e.g., the root domain and/or subdomains, the root domain and a wildcard covering all subdomains of the root domain, etc.). At operation 445, the service server 125 receives the digital certificate from the Certificate Authority 128. The service server 125 may display a message to the domain owner and/or transmit an email message or other status message that alerts the user of the successful issuance of the digital certificate for the domain.

Flow then moves to operation 450 and the service server 125 causes the digital certificate to be installed. For example, the service server 125 installs 178 the digital certificate for the domain on the proxy server 120 (assuming that the domain resolves to the proxy server 120). The service server 125 may also keep a store of the certificates in the certificate store 126. Installing the digital certificate will be described in more detail with reference to FIGS. 6 and 8.

In one embodiment, the DNS records of the domain continue to point directly to their origin sever until the email verification is complete, the certificate has been issued by the Certificate Authority, and it has been installed and enabled on each appropriate proxy server. After this occurs, the DNS records are updated to point to the appropriate proxy servers.

Figure 5:
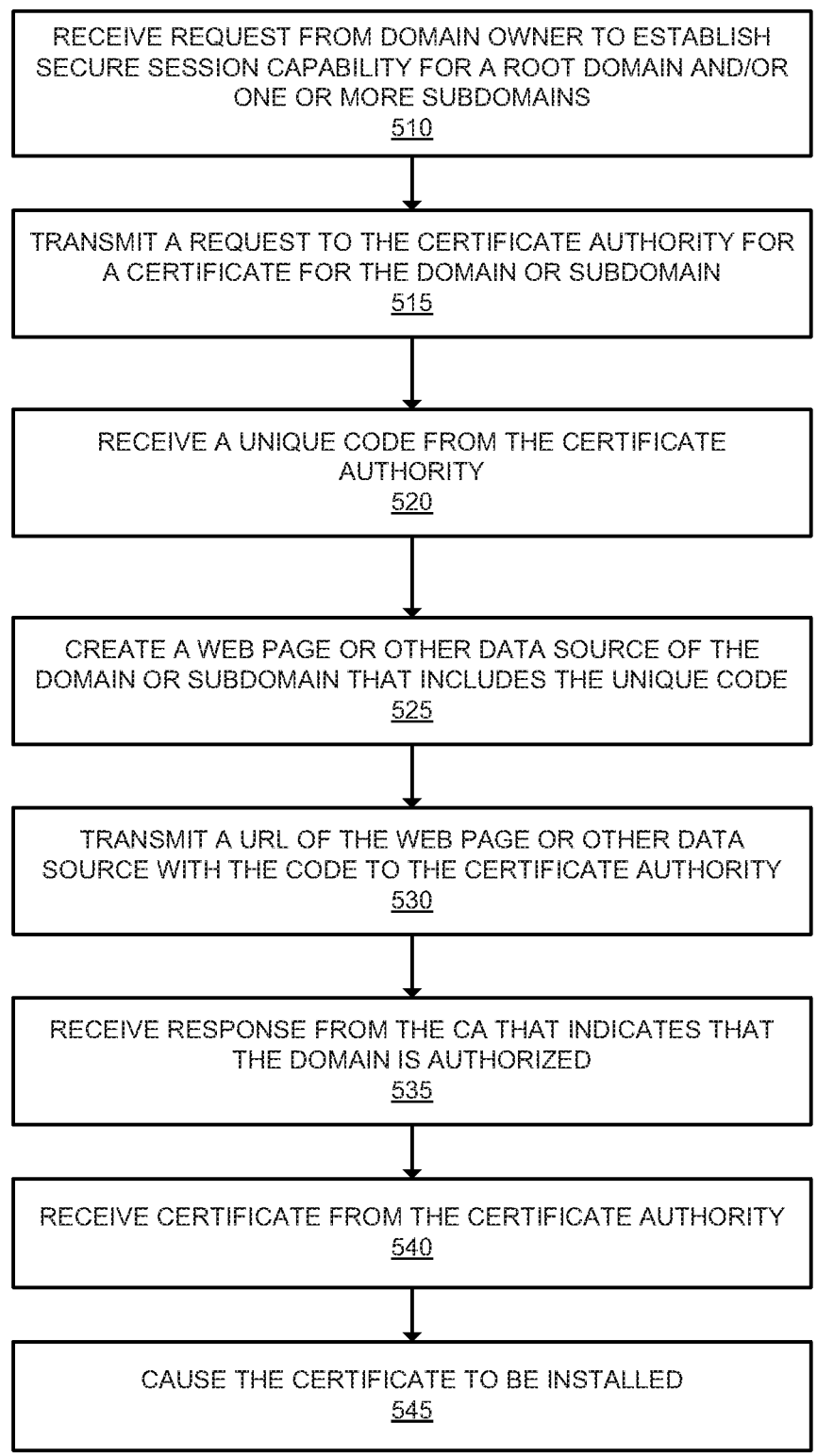
FIG. 5 is a flow diagram that illustrates a web page validation procedure for secure session registration according to one embodiment.

FIG. 5 is a flow diagram that illustrates a web page validation procedure according to one embodiment. The operations of FIG. 5 will be described as being performed by the service server 125, however it should be understood that one or more other devices may perform operations described with reference to FIG. 5, and the service server 125 may perform operations different than those discussed with reference to FIG. 5. In addition, the operations described with reference to FIG. 5 can be performed in addition to, or in lieu of, the operations described with reference to FIG. 4. The operations described with reference to FIG. 5 can be performed in conjunction with the operations described with reference to FIG. 3.

At operation 510, the service server 125 receives a request from a domain owner 135 to establish secure session capability for a root domain and/or one or more subdomains. Next, the service server 125 transmits a request for a certificate for the root domain and/or one or more subdomains to the Certificate Authority 128 at operation 515. In some embodiments, the request includes multiple entries associated with the domain as described in FIG. 3 (e.g., the created entry(ies) described in operation 310). By way of a specific example, the entries may include the root domain (e.g., example.com) and a wildcard covering all subdomains of the root domain (e.g., *.example.com).

Flow then moves to operation 520 and the service server 125 receives from the Certificate Authority 128 a unique code generated for that domain to prove authenticity. The service server 125 may receive the unique code via email, text message, or through other means.

Next, at operation 525, the service server 125 creates or modifies a web page or other resource of the domain or subdomain to include the unique code. For example, the service server 125 may create an HTML page for the domain or subdomain that includes the unique code. As another example, the service server 125 may modify a page to include the unique code (e.g., by adding the unique code in the header of the page). As another example, the service server 125 inserts a TXT DNS record for the root domain or subdomain that includes the unique code. As another example, in one embodiment, if the Certificate Authority allows, the service server 125 creates a new subdomain for verification purposes (e.g., verifycode.example.com) that is routed through the proxy network (e.g., verifycode.example.com resolves to an IP address of a proxy server). The Certificate Authority may periodically check that particular subdomain for the unique verification code.

The web page or other resource with the unique code may be installed at the proxy server 120 (assuming that the proxy server resolves to the domain or subdomain). For example, consider the domain example.com and assume it resolves to the proxy server 120, the service server 125 may create or modify a web page with the URL http://example.com/verification.html that includes the unique code that is accessible by the Certificate Authority upon request. In another embodiment, the web page is installed and hosted at the particular origin server 135 that hosts the domain or subdomain.

Flow then moves to operation 530 and the service server 125 transmits a URL of the web page or other resource that includes the unique code to the Certificate Authority 128. Sometime after receiving the URL, the Certificate Authority 128 requests the web page or other resource that is identified in the received URL. This request may be routed through the proxy server 120, which may locally respond to the Certificate Authority 128 (if the web page is locally accessible to the proxy server 120 (e.g., in its cache)) or transmit the request to the origin server that hosts the domain or subdomain. In either case, the Certificate Authority 128 receives the requested web page or other resource. The Certificate Authority 128 parses the web page or other resource for the unique code. If the Certificate Authority 128 locates the unique code for the domain or subdomain that it previously generated, then it transmits a response to the service server 125 that indicates that the domain or subdomain is authorized and generates and transmits a digital certificate for the domain or subdomain to the service server 125. If the Certificate Authority 128 fails to locate the unique code for the domain or subdomain (e.g., the web page or other data source does not include the unique code), then the Certificate Authority 128 transmits an error message to the service server 125 that indicates that the domain is not authorized.

With respect to FIG. 5, at operation 535, the service server 125 receives a response from the Certificate Authority 128 that indicates that the domain is authorized. The service server 125 may update the validation status of the domain owner corresponding to the domain in the customer store 127.

Next, at operation 540, the service server 125 receives the digital certificate for the domain or subdomain from the Certificate Authority 128. The service server 125 may display a message to the domain owner and/or transmit an email message or other status message that alerts the user of the successful issuance of the digital certificate for the domain. Flow then moves to operation 545 and the service server 125 causes the digital certificate to be installed. For example, the service server 125 installs 178 the digital certificate for the domain on the proxy server 120 (assuming that the domain resolves to the proxy server 120). The service server 125 may also keep a database of the certificates in the certificate store 126. Installing the digital certificate will be described in more detail with reference to FIGS. 6 and 8.

In one embodiment, if the Certificate Authority requires that the web-based verification process be performed on the root domain or a particular subdomain through which traffic passes outside of the proxy network, or if the service server 125 cannot create a new subdomain for verification purposes (e.g., if the authoritative name server of the domain is not changed to one of the service and instead a CNAME resolves to a proxy server), the service server 125 causes the DNS records of the domain to temporality point to the proxy network long enough for the Certificate Authority 128 to check the domain for the unique code. Responsive to the service server 125 receiving confirmation that the Certificate Authority 128 has checked the domain, the service server 125 causes the DNS records of the domain to point back to the origin server until the certificate is installed and enabled throughout the proxy network.

In one embodiment, the proxy server 120 attempts to encrypt communications between the proxy server 120 and the origin server 130 using a previously installed certificate on the origin sever. For example, the domain owner 135A may have received a certificate from a certificate authority for the origin server 130A, which may be used by the proxy server 120 when negotiating secure sessions with that origin server 130A. In another embodiment, the proxy server 120 encrypts the communication between the proxy server 120 and the origin server 130 using a self signed certificate (e.g., a certificate signed by the origin server 130), an expired certificate issued by a certificate authority, or a certificate for another domain.

While FIGS. 4 and 5 illustrate a single domain owner being validated, in some embodiments multiple domain owners need to be validated before the Certificate Authority generates the digital certificate. For example, if the request for the digital certificate includes multiple domains that are owned by multiple domain owners that are each not validated, the Certificate Authority will perform the validation procedure with respect to each of the domain owners prior to issuing the certificate.

Installing Digital Certificates

In some embodiments, multiple proxy servers are geographically distributed in multiple point of presences (POPs). A POP is a collection of networking equipment (e.g., proxy server(s) and may include authoritative name server(s)) that are geographically distributed to decrease the distance between requesting client devices and the content. Multiple proxy servers may have the same anycast IP address. The network topology determines the best route to find the nearest server. For example, when a DNS request is made, the network transmits the DNS request to the closest authoritative name server. That authoritative name server then responds with a proxy server within that POP. Accordingly, a visitor will be bound to that proxy server until the next DNS resolution for the requested domain (according to the TTL (time to live) value as provided by the authoritative name server). Thus, an anycast IP address allows a domain to resolve to a physically different proxy server depending on location of the client device even though the proxy servers share the same IP address. Anycast is also useful as a reliability mechanism as it can provide automatic failover. For example, if one of the proxy server's fail, the request will be automatically routed to another proxy server that shares the same anycast IP address. In some embodiments, instead of using an anycast mechanism, embodiments use a geographical load balancer to route traffic to the nearest POP.

Figure 6:
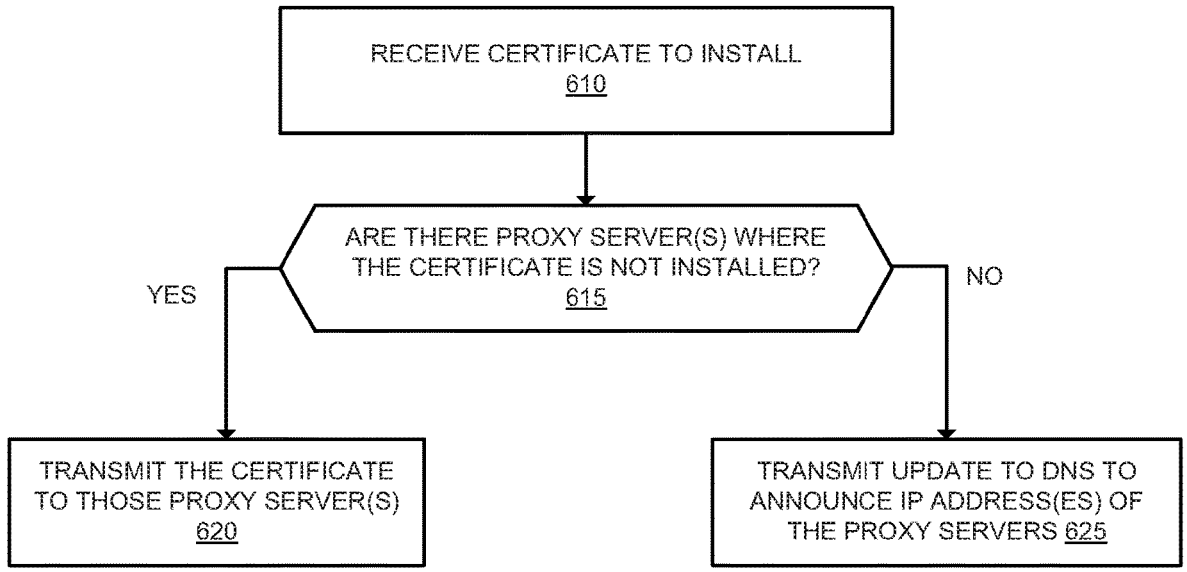
FIG. 6 is a flow diagram illustrating exemplary operations for installing a certificate in a cloud-based proxy service according to one embodiment.

As a result of having multiple proxy servers, the certificates are installed in multiple locations. FIG. 6 is a flow diagram illustrating exemplary operations performed by the service server 125 when installing a certificate according to one embodiment. At operation 610, the service server 125 receives a certificate to install from the Certificate Authority 128. In one embodiment, the service server 125 receives a primary certificate and a secondary certificate.

Flow then moves to operation 615 where the service server 125 determines whether there are proxy server(s) where the certificate(s) are not installed. For example, the service server 125 accesses the certificate store 126 to determine the status of installation of the certificate(s).

Figure 7:
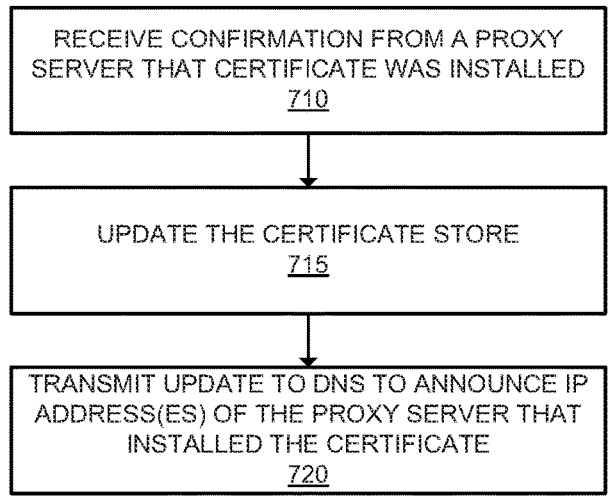
FIG. 7 is a flow diagram illustrating exemplary operations for updating the installation status of a certificate according to one embodiment.

As a certificate is successfully installed, the service server 125 updates the status of installation accordingly. For example, FIG. 7 is a flow diagram illustrating exemplary operations for updating a certificate's installation status. At operation 710, the service server 125 receives confirmation from a proxy server that a certificate was successfully installed. Next, at operation 715, the service server 125 updates the certificate store 126 accordingly. For example, the service server 125 marks the certificate as being installed in that proxy server. Next, at operation 720, the service server 125 transmits an update to the DNS system 140 to announce the IP address of the proxy server that resolves to the domain.

If there are proxy server(s) where the certificate(s) are not installed, then flow moves to operation 620 where the certificate(s) are transmitted to those proxy servers. In one embodiment, only those proxy server(s) that resolve to the domain(s) bound in the certificate(s) are sent the certificate(s), while in other embodiments each proxy server is sent the certificate(s). If the certificate(s) are installed (or at least the primary certificate) in each of the proxy server(s), then flow moves to operation 625 and the service server 125 transmits a DNS update 180 to the DNS system 140 to announce the IP address(es) of the proxy server(s) that have installed the certificate.

Figure 8:
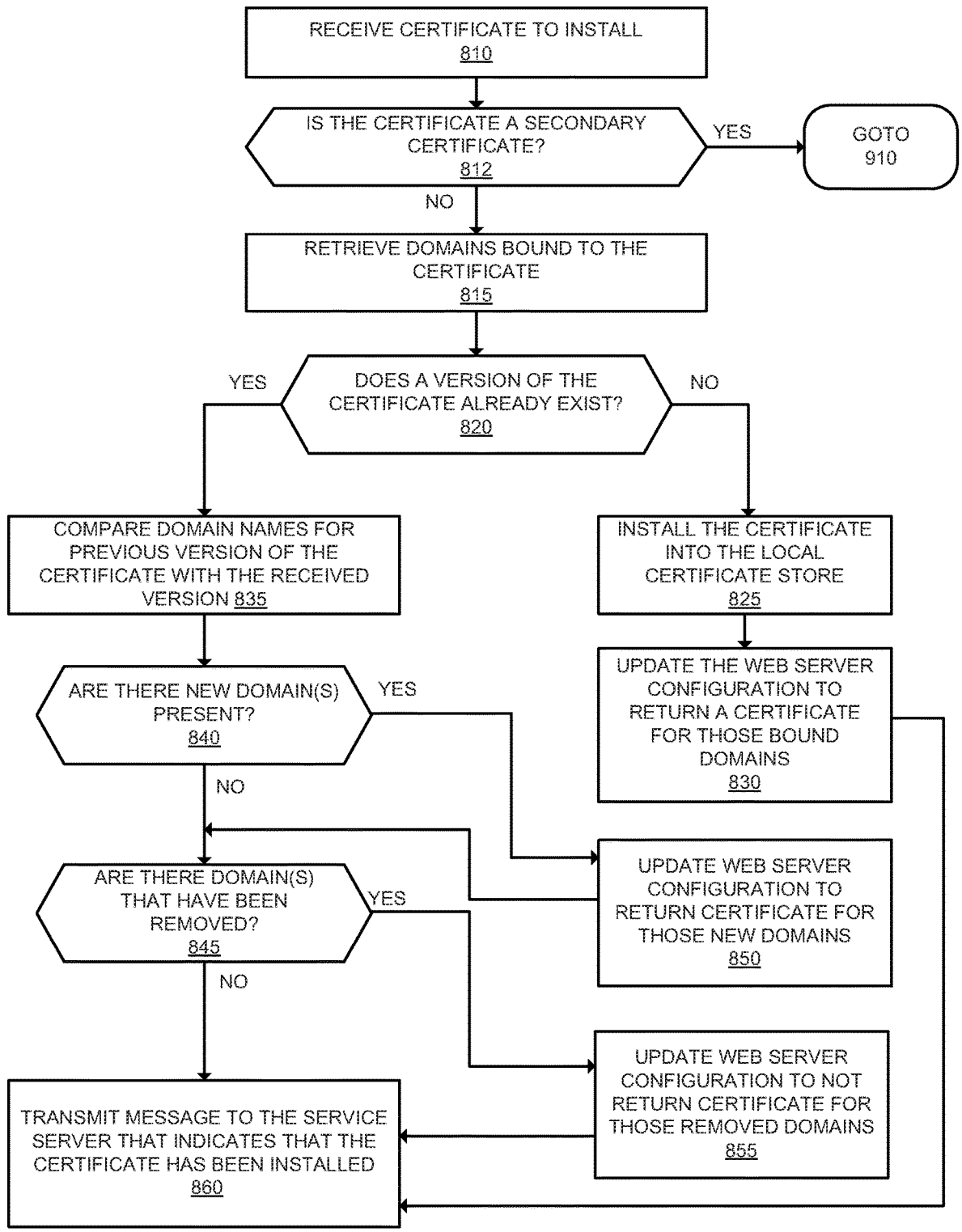
FIG. 8 is a flow diagram illustrating exemplary operations for a proxy server in a cloud-based proxy service to install a certificate according to one embodiment.

FIG. 8 is a flow diagram illustrating exemplary operations for a proxy server to install a certificate according to one embodiment. The operations of FIG. 8 will be described with reference to the exemplary embodiment of FIG. 1. However, it should be understood that the operations of FIG. 8 can be performed by embodiments of the invention other than those discussed with reference to FIG. 1, and the embodiments discussed with reference to FIG. 1 can perform operations different than those discussed with reference to FIG. 8.

At operation 810, the proxy server 120 receives a certificate to install. For example, the proxy server 120 receives a certificate to install from the service server 125. Flow then moves to operation 812 and the proxy server 120 determines whether the certificate is a secondary certificate (e.g., as opposed to a primary certificate). In one embodiment, the proxy server 120 determines whether the certificate is a secondary certificate by evaluating the domain(s) that are bound to the certificate. In another embodiment, the proxy server 120 marks an indication of whether a certificate is a primary certificate or other type of certificate (e.g., a secondary certificate, a tertiary certificate, etc.). If the certificate is bound only to a root domain and one or more of its subdomains, then the certificate is a secondary certificate. In another embodiment, the service server 125 indicates whether the certificate is a primary or secondary certificate when sending to the proxy server 120. If the certificate is a secondary certificate, then flow moves to operation 910, which will be described with reference to FIG. 9, otherwise flow moves to operation 815. In embodiments where a primary and secondary certificate are not used, the operation 812 is not performed.

At operation 815, the proxy server 120 analyzes the certificate and retrieves the domain(s) that are bound to the certificate (e.g., included in the SAN extension field of the certificate). Flow then moves to operation 820 and the proxy server 120 determines whether a version of the certificate already exists. For example, the proxy server 120 accesses its local certificate store 122 to determine whether a version of the certificate already exists. For example, the proxy server 120 may compare the serial number of the certificate received with serial numbers of certificates already received. As another example, the proxy server 120 may generate a hash of the certificate and compare the resulting hash value with previously generated hash values. If the proxy server 120 does not have a version of the certificate, then flow moves to operation 835, otherwise flow moves to operation 825.

At operation 825, the proxy server 120 installs the certificate into the local certificate store 126. In one embodiment, the proxy server 120 also associates one or more IP addresses with the certificate. Flow then moves to operation 830 and the proxy server 120 updates its web server configuration to return the certificate for those domains bound in the certificate. For example, the proxy server 120 updates its web server configuration such that when receiving an SSL or TLS client-hello message at the IP address associated with the certificate, the proxy server 120 will return the certificate that is associated with the IP address. Flow then moves from operation 830 to operation 860 and the proxy server 120 transmits a message to the service server 125 that indicates that the certificate has been installed. The message may also indicate the IP address(es) that are associated with the certificate. In one embodiment, the proxy server 120 transmits a DNS update to the DNS system 140 to announce the IP address(es) that resolve to the domain(s) bound in the certificate.

If a version of the certificate already exists, then at operation 835 the proxy server 120 compares the domain names included in the previous version of the certificate with the domain names (e.g., listed in the SAN extension field) included in the newly received version of the certificate. Flow then moves to operation 840 where the proxy server 120 determines whether there are new domain(s) present in the newly received certificate version. If there are, then flow moves to operation 850 and the proxy server 120 updates its web server configuration to return the certificate for those new domains. Flow moves from operation 850 back to operation 845.

If there are not new domain(s) present in the newly received certificate, then flow moves to operation 845 and the proxy server 120 determines whether there are domain(s) that have been removed from the newly received certificate. If there are, then flow moves to operation 855 and the proxy server 120 updates its web server configuration to not return the certificate for those removed domains. Flow then moves from operation 855 to operation 860. If there is not a new domain present in the newly received certificate, then flow moves to operation 860.

Figure 9:
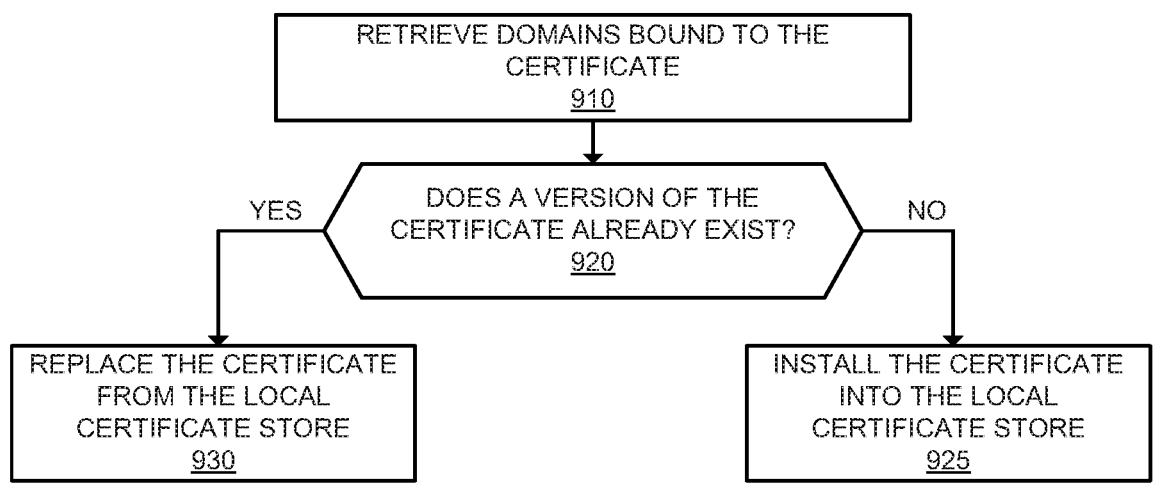
FIG. 9 is a flow diagram illustrating exemplary operations performed at a proxy server in a cloud-based proxy service to install a secondary certificate according to one embodiment

FIG. 9 is a flow diagram illustrating exemplary operations performed at a proxy server to install a secondary certificate according to one embodiment. The operations of FIG. 9 will be described with reference to the exemplary embodiment of FIG. 1. However, it should be understood that the operations of FIG. 9 can be performed by embodiments of the invention other than those discussed with reference to FIG. 1, and the embodiments discussed with reference to FIG. 1 can perform operations different than those discussed with reference to FIG. 9.

At operation 910, the proxy server 120 analyzes the certificate and retrieves the domain(s) that are bound to the certificate (e.g., included in the SAN extension field of the certificate). Flow then moves to operation 920 and the proxy server 120 determines whether a version of the certificate already exists. For example, the proxy server 120 accesses its local certificate store 122 to determine whether a version of the certificate already exists. For example, the proxy server 120 may compare the serial number of the certificate received with serial numbers of certificates already received. As another example, the proxy server 120 may generate a hash of the certificate and compare the resulting hash value with previously generated hash values. If the proxy server 120 does not have a version of the certificate, then flow moves to operation 935, otherwise flow moves to operation 930.

At operation 925, the proxy server 120 installs the certificate into the local certificate store 126. In one embodiment, the proxy server 120 associates the secondary certificate with a particular IP address, while in other embodiments the proxy server 120 does not associate the secondary certificate with an IP address. At operation 930, the proxy server 120 replaces or updates the certificate in the local certificate store with the received certificate.

Unlike the operations described with reference to FIG. 8, in one embodiment the proxy server 120 does not automatically update its web server configuration to return the secondary certificate. Instead, the secondary certificate is used as a backup certificate in case of an attack on the IP address associated with the primary certificate or when moving the corresponding domain from a particular primary certificate to another primary certificate.

Establishing Secure Sessions

Figure 10:
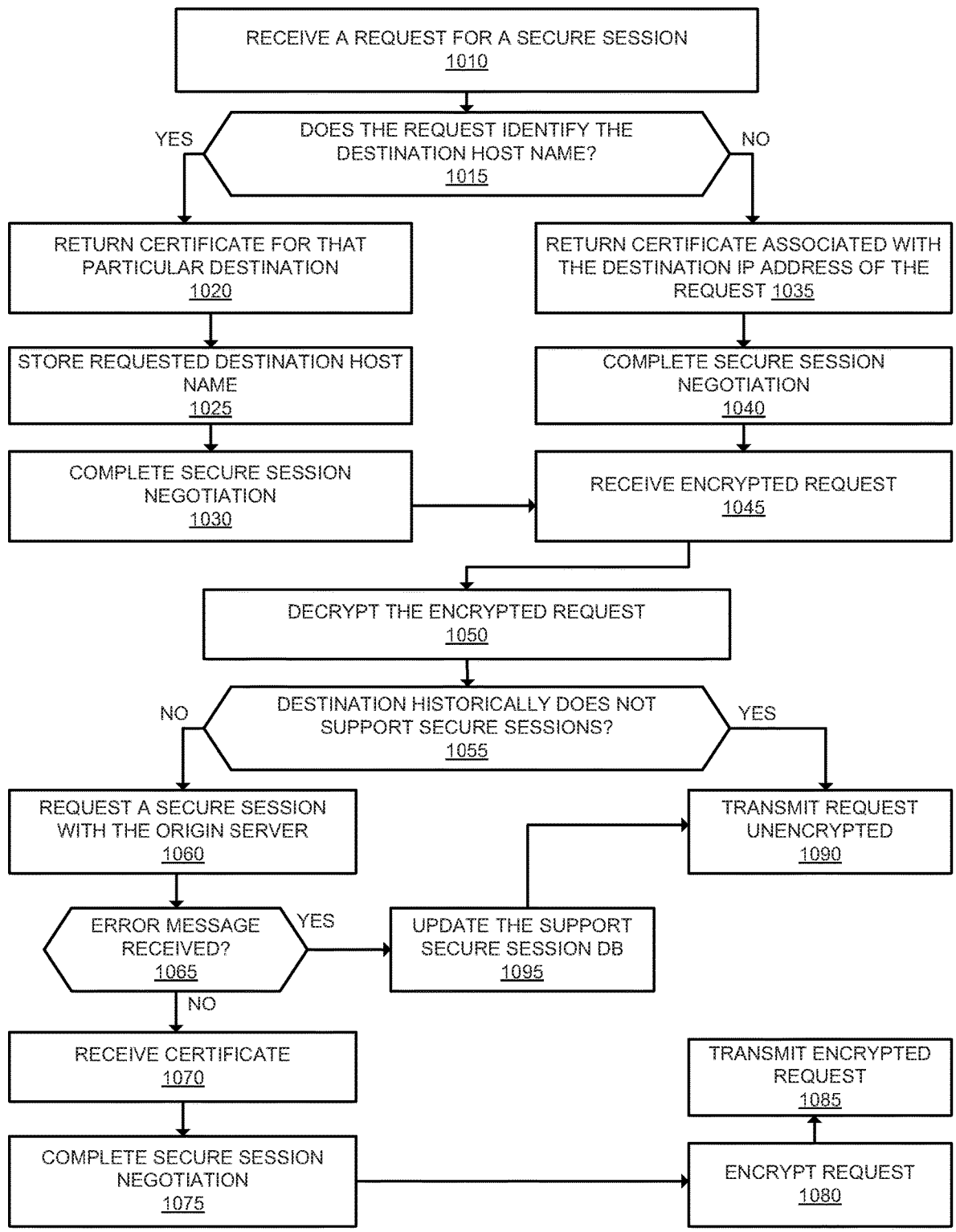
FIG. 10 is a flow diagram illustrating exemplary operations performed by a proxy server for establishing and using secure sessions in a cloud-based proxy service according to one embodiment.

FIG. 10 is a flow diagram illustrating exemplary operations performed by a proxy server for establishing and using secure sessions in a cloud-based proxy service according to one embodiment. The operations of FIG. 10 will be described with reference to the exemplary embodiment of FIG. 1. However, it should be understood that the operations of FIG. 10 can be performed by embodiments of the invention other than those discussed with reference to FIG. 1, and the embodiments discussed with reference to FIG. 1 can perform operations different than those discussed with reference to FIG. 10.

At operation 1010, the proxy server 120 receives a request for a secure session from a client device 110. For example, the proxy server 120 receives an SSL or TLS client-hello message from the client device 110. The request may be received at the proxy server 120 as a result of DNS for the domain resolving to the proxy server 120. Next flow moves to operation 1020 and the proxy server 120 determines whether the request for the secure session identifies the destination host name. For example, the request will identify the destination host name if it includes the SNI extension supported by TLS. If the request does not identify the destination host name (e.g., if the client-hello message does not include the SNI extension), then flow moves to operation 1035. If the request identifies the destination, flow moves to operation 1020.

At block 1020, the proxy server 120 returns the certificate bound to the destination identified in the request to the requesting client device 110. For example, the proxy server 120 accesses the certificate store 122 to retrieve the certificate that is bound to the destination identified in the request and transmits that certificate to the requesting client device 110. In one embodiment, the certificate is bound only to the destination domain identified in the request (e.g., it does not have other domains in the SAN extension of the certificate). In other embodiments, the certificate may also be bound to other domains. For example, the certificate may include a wildcard to enable multiple sub-domains to use the same certificate (e.g., *.example.com may be used to secure blog.example.com, mail.example.com, etc.). As another example, the certificate may include other domains in the SAN extension of the certificate, which may or may not be owned or operated by the same domain owner. Flow moves from operation 1020 to operation 1025, where the proxy server 120 stores the requested destination host name in association with the secure session. Flow then moves to operation 1030.

At operation 1030, the proxy server 120 completes the secure session negotiation with the client device 110. For example, the proxy server 120 and the client device 110 determine the cryptographic protocol used for the encryption, establish session keys for the secure connection, etc. Flow moves from operation 1030 to operation 1045.

At operation 1035 (the request for the secure session does not identify the destination host name), the proxy server 120 returns the certificate associated with the destination IP address of the request. For example, the proxy server 120 accesses the certificate store 122 to retrieve the certificate that is associated with the destination IP address of the secure session request and transmits that certificate to the requesting client device 110. In one embodiment, the certificate is bound to multiple domains, which may or may not belong to different domain owners. For example, the certificate may include a number of domains in the Subject Alternate Name (SAN) field of the certificate. Flow moves from operation to operation 1035 where the proxy server 120 completes the secure session negotiation with the client device 110. For example, the proxy server 120 and the client device 110 determine the cryptographic protocol used for the encryption, establish session keys for the secure connection, etc. Flow moves from operation 1030 to operation 1045.

At operation 1045, the proxy server 120 receives an encrypted request from the client device 110 (e.g., an HTTPS request). The encrypted request was encrypted using the certificate the proxy server 120 returned. Next, at operation 1050, the proxy server 120 decrypts the encrypted request. Decrypting the encrypted request, among other things, allows the proxy server 120 to determine the destination host, which is indicated in the Host header of the request.

Flow then moves to operation 1055, where the proxy server 120 determines whether the destination historically does not support secure sessions (e.g., whether the connection between the proxy server and the origin server 130 corresponding to the destination can be encrypted using SSL or TLS). For example, the proxy server 120 accesses the support secure session data store 124 to determine whether the origin server 130 corresponding to the destination host name has previously supported secure sessions. The support secure session store 124 may also indicate the type of secure session supported by the origin server (e.g., SSL, TLS, versions of SSL or TLS, etc.). In one embodiment, the support secure session store 124 is populated in an offline process that periodically checks whether the origin server supports secure sessions by attempting to establish a secure session and recording the outcome. If the proxy server 120 determines that the destination origin server 130 historically does not support secure sessions, then flow moves to operation 1090, otherwise flow moves to operation 1060.

At operation 1060, the proxy server 120 requests a secure session with the origin server 130. In one embodiment, the secure session request identifies the destination host name. For example, the proxy server 120 transmits a TLS client-hello message that includes the SNI extension that identifies the destination host name to the origin server 130 to request the secure session. Including the SNI extension in the client-hello message allows the hosting provider to implement name-based virtual hosting and return the appropriate certificate for that host. In this way, even if client devices 110 do not support TLS with the SNI extension (e.g., they are running older browsers and/or operating systems that do not support TLS with SNI), the proxy server 120 can support a secure connection between it and the client device 110 while simultaneously supporting a secure session with the origin server 130 with the SNI extension so name-based virtual hosting can be reliably be supported by the origin server 130.

Flow then moves to operation 1065, where the proxy server 120 determines whether it receives an error message (e.g., the server did not respond) or otherwise the secure session negotiation failed. If the proxy server 120 receives an error message or the secure session negotiation has otherwise failed, then flow moves to operation 1095 and the proxy server 120 updates the support secure session data store 124 that the destination does not support secure sessions. Flow moves from operation 1095 back to operation 1090.

If the proxy server 120 does not receive an error message, then flow moves to operation 1070 where the proxy server 120 receives a certificate from the origin server 130 (e.g., in an SSL or TLS server-hello message). In one embodiment the proxy server 120 ignores validation errors associated with the certificate received from the origin server 130. This allows the origin server 130 to return a certificate that may not be bound to the destination domain identified in the secure session request, return an expired certificate, and/or return a self-signed certificate. Of course, the certificate may be bound to the destination domain identified in the secure session request, be issued by a Certificate Authority, and not be expired.

Flow then moves to operation 1075 and the proxy server 120 completes the secure session negotiation with the origin server 130. For example, the proxy server 120 and the origin server 130 determine the cryptographic protocol used for the encryption, establish session keys for the secure connection, etc. After the secure session negotiation is established, traffic between the proxy server 120 and the origin server 130 can be encrypted. Flow moves from operation 1075 to operation 1080.

At operation 1080, the proxy server 120 encrypts the request that was decrypted in operation 1050 using the certificate provided by the origin server 130. Next, the proxy server 120 transmits the encrypted request to the origin server 130 at operation 1085. The origin server 130 responds with an encrypted response that the proxy server 120 decrypts. The proxy server 120 then encrypts that response according to the secure session established with the client device 110 and transmits that encrypted response to the client device 110.

Referring back to operation 1055, if the destination historically does not support secure sessions, then flow moves to operation 1090 and the proxy server 120 transmits the request to the origin server 130 unencrypted. Thus, in some instances the service supports a partial-secure connection (secure from the client device to the proxy server and unsecure from the proxy server and the origin server). This may be useful in that some domain owners (particularly domain owners with small sites) have difficulty in installing a certificate that can be used between the proxy server and their origin server.

Figure 11:
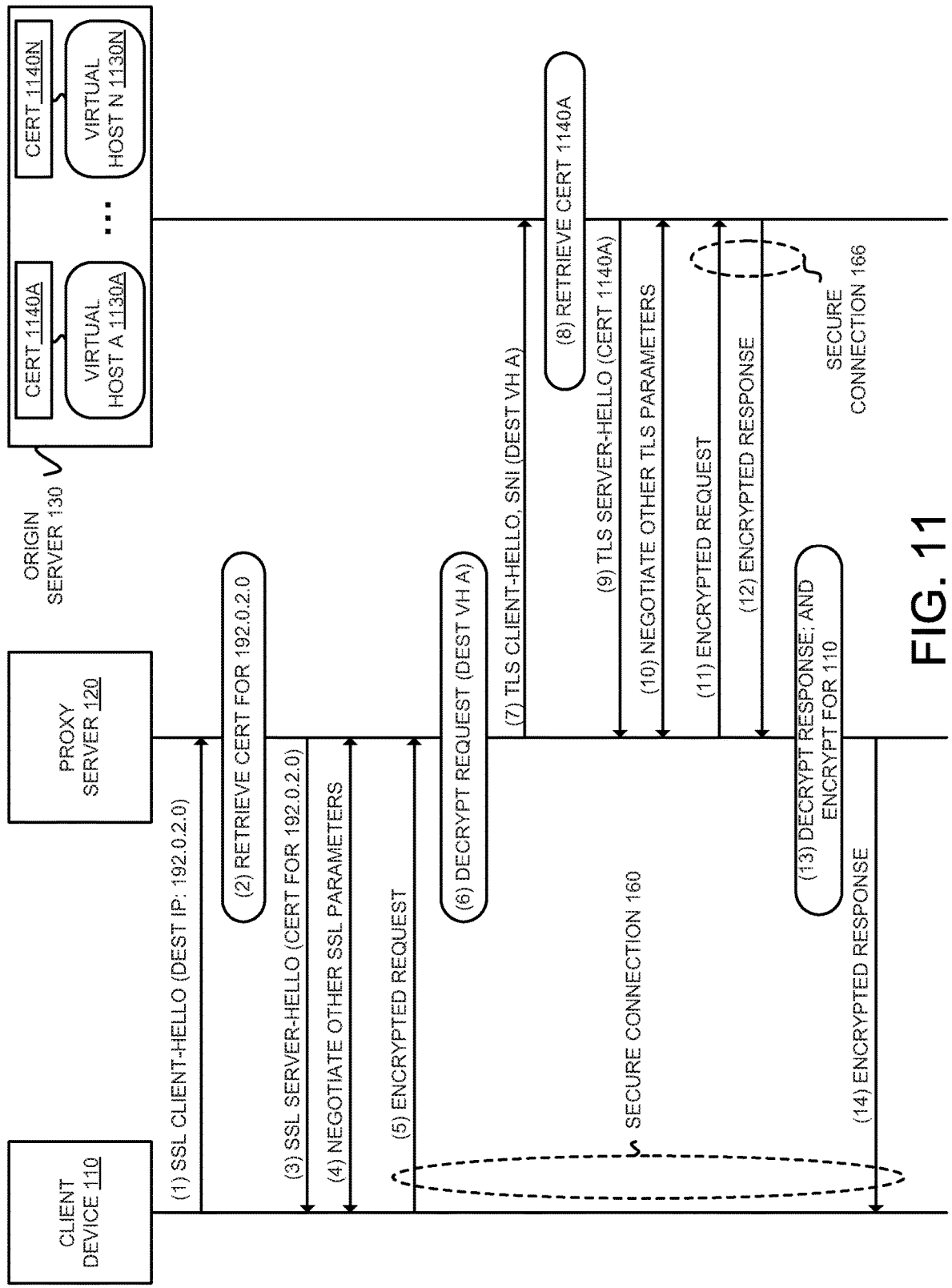
FIG. 11 is a data flow diagram that illustrates exemplary operations for establishing and using secure sessions in a cloud-based proxy service according to one embodiment.

FIG. 11 is a data flow diagram that illustrates exemplary operations for establishing and using secure sessions in a cloud-based proxy service according to one embodiment. As illustrated in FIG. 11, the origin server 130 is performing virtual hosting and includes the virtual host A 1130A to virtual host N 1130N which are associated with the certificates 1140A to 1140N respectively. For purposes of FIG. 11, the origin server 130 is performing name-based virtual hosting such that the virtual hosts A-N 1130A-N share the same IP address.

The client device 110 initiates a secure session with the proxy server 120 by transmitting an SSL client-hello message to the proxy server 120 at operation 1. The SSL client-hello message is directed to the proxy server 120 as a result of a requested domain resolving to the proxy server 120. The SSL client-hello message does not indicate the destination host name. The SSL client-hello message has a destination IP address of 192.0.2.0, which is at least one of the IP addresses that points to the proxy server 120. At operation 2, the proxy server 120 retrieves the certificate that is associated with IP address 192.0.2.0. The certificate may be bound to multiple domains through use of a wildcard identifier and/or inclusion of multiple domains in the certificate's SAN extension field. Next, at operation 3, the proxy server 120 transmits an SSL server-hello message that includes the certificate associated with IP address 192.0.2.0. The client device 110 and the proxy server 120 negotiate other SSL parameters at operation 4 in order to establish the secure connection 160 (e.g., negotiate the cryptographic protocol for the encryption, establish session keys for the secure connection, etc.).

At operation 5, the client device 110 transmits an encrypted request (e.g., HTTPS request) to the proxy server 120 over the secure connection 160. The proxy server 120 decrypts the request and determines that the destination host (e.g., by analyzing the Host header field of the request) is hosted at the origin server 130 at operation 6. For this example, the destination host corresponds with the virtual host A 1130A. Next, at operation 7, the proxy server 120 transmits a TLS client-hello message that includes an SNI extension field that identifies the virtual host A 1130A as the destination to the origin server 130.

Since the TLS client-hello message identifies the destination host, the origin server 130 retrieves the certificate bound to that destination host 1130A (the certificate 1140A) at operation 8. At operation 9, the origin server 130 transmits a TLS server-hello message that includes the certificate 1140A to the proxy server 120. The proxy server 120 and the origin server 130 negotiate other TLS parameters at operation 10 to establish the secure connection 160 (e.g., negotiate the cryptographic protocol for the encryption, establish session keys for the secure connection, etc.).

At operation 11, the proxy server 120 transmits an encrypted request (HTTPS) to the origin server 130 over the secure connection 166. The encrypted request is based on the request received from the client device in operation 5. For example, if the request received from the client is for example.com/index.html (which is hosted by the origin server 130), the proxy server 120 transmits an encrypted request for example.com/index.html to the origin server 130. At operation 12, the origin server 130 transmits an encrypted response to the proxy server 120 over the secure connection 166. The proxy server 120, in turn, decrypts the response and encrypts it for transmission to the client device 110 at operation 13. In one embodiment, the proxy server 120 also caches the requested content such that future requests for that content may be served from its cache. At operation 14, the proxy server 120 transmits the encrypted response to the client device 110 over the secure connection 160.

While FIG. 11 illustrates a secure session between the client device 110 and the proxy server 120 and a secure session between the proxy server 120 and the origin server 130, in some embodiments there is only a secure session between the client device 110 and the proxy server 120. In such embodiments, the proxy server 120 transmits the request (e.g., the request as decrypted in operation 6) to the origin server 130 unencrypted.

Managing Certificates Bound with Multiple Different Domains

As described above, in some embodiments multiple different domains are bound to the same certificate each sharing the same IP address. As a result, an attack (e.g., denial of service (DoS), distributed DoS (DDos), etc.) on one of the domains affects the services of the other domains. For example, if example1.com and example2.com are bound to the same certificate each sharing the same IP address (example1.com and example2.com both resolve to the same IP address), an attack on example1.com may affect the services on example2.com.

After detecting an attack on an IP address that is associated with a certificate that is bound with multiple different domains, the proxy server 120 accesses the secondary certificate(s) of the multiple different domains and associates each of them with a unique IP address. The proxy server 120 updates its web server configuration for each secondary certificate such that when receiving an SSL or TLS client-hello message at the IP address associated with that certificate, the proxy server 120 will return that certificate. The DNS system 140 is updated such that the domains in the secondary certificates resolve to the appropriate IP addresses. In one embodiment, the proxy server 120 transmits one or more messages to the service server 125 to report that domain(s) new IP addresses, which in turn updates the DNS system 140. In another embodiment, the proxy server 120 updates the DNS system 140.

Figure 12:
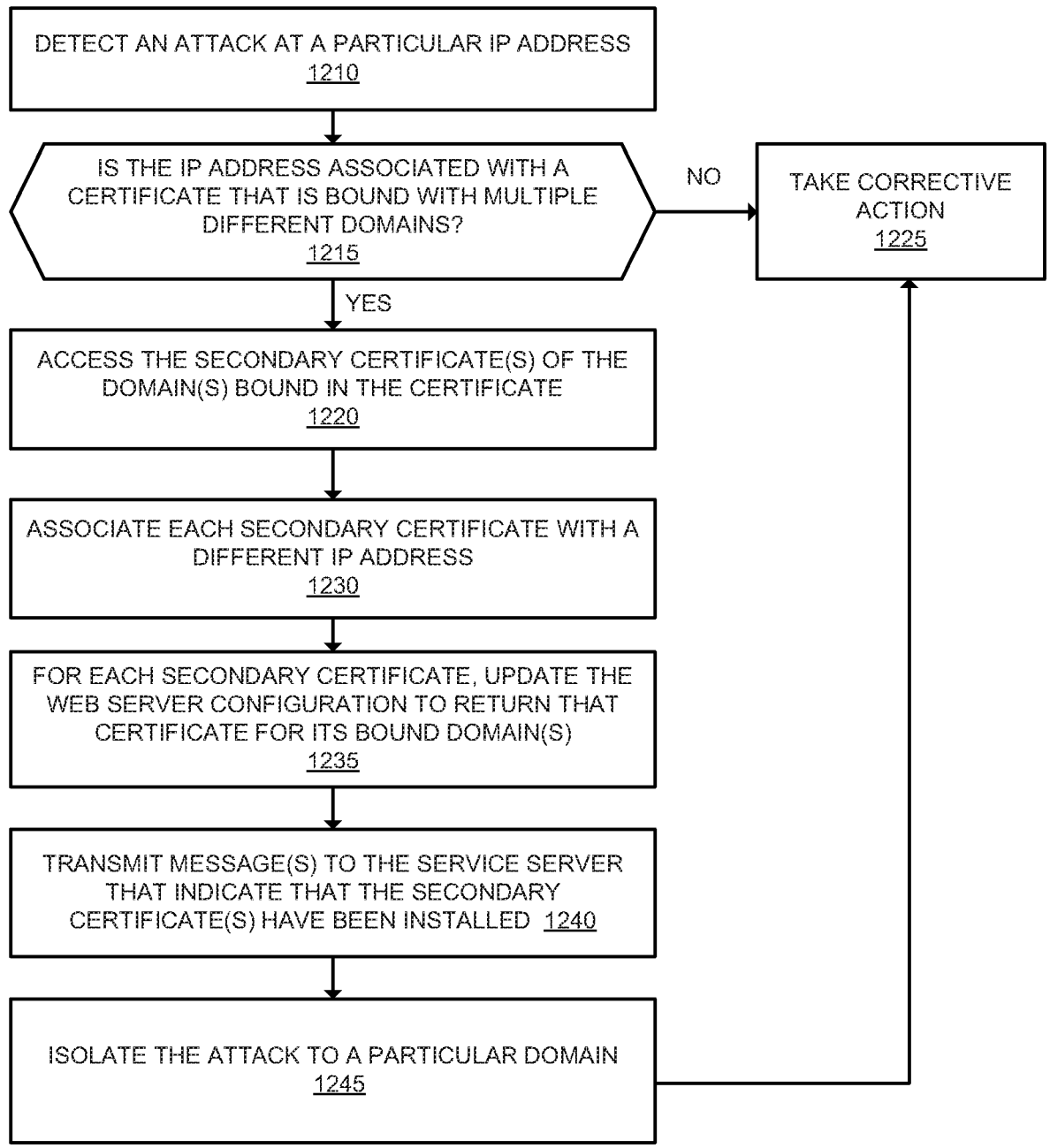
FIG. 12 is a flow diagram illustrating exemplary operations performed on a proxy server for responding to an attack on a particular IP address according to one embodiment.

FIG. 12 is a flow diagram illustrating exemplary operations performed on a proxy server for responding to an attack on a particular IP address according to one embodiment. At operation 1210, the proxy server 120 detects that there is an attack on a particular IP address of the proxy server 120. The attack may include, for example, a denial of service attack (DoS) or distributed denial of service (DDos) attack on the IP address. Next, the proxy server 120 determines whether the IP address is associated with a certificate that is bound with multiple different domains at operation 1215 (e.g., the IP address is associated with a certificate that is bound with example1.com and example2.com). If the IP address is associated with such a certificate, then flow moves to operation 1220, otherwise flow moves to operation 1225 where corrective action is taken (e.g., the traffic to that IP address is throttled, the traffic to that IP address is routed to dedicated hardware to mitigate the attack, the traffic to that IP address is routed to a particular data center that is dedicated for attacks, the IP address may be null-routed, the DNS records can be changed such that the domain resolves to the IP address of the origin server, etc.).

At operation 1220, the proxy server 120 accesses the secondary certificate(s) of the domain(s) bound in the certificate. In one embodiment, the proxy server 120 accesses the local certificate store 122 to access the secondary certificate(s). In another embodiment, the proxy server 120 requests the secondary certificate(s) from a central location (e.g., from the service server 125). Flow then moves to operation 1230.

At operation 1230, the proxy server 120 associates each secondary certificate with a different IP address. Thus, the proxy server 120 associates each secondary certificate with its own unique IP address. Flow then moves to operation 1235 where, for each of the accessed secondary certificates, the proxy server 120 updates its web server configuration to return that certificate for that certificate's bound domain(s). For example, the proxy server 120 updates its web server configuration for each certificate such that when receiving an SSL or TLS client-hello message at the IP address associated with that certificate, the proxy server 120 will return that certificate. Updating the web server configuration also includes an update to not return the certificate that was associated with the IP address experiencing the attack.

Flow then moves from operation 1235 to operation 1240 and the proxy server 120 transmits one or more messages to the service server 125 that indicates that the certificate(s) have been installed. The message(s) may also indicate for each certificate the IP address(es) that are associated with those certificates. The service server 125 in turn transmits a DNS update to the DNS system to announce the IP address(es) that resolve to the domain(s) bound in the certificate. In an alternative embodiment, for each certificate, the proxy server 120 transmits a DNS update to the DNS system 140 to announce the IP address(es) that resolve to the domain(s) bound in that certificate.

Flow then moves to operation 1245, where the proxy server 120 isolates the attack to a particular domain. Since each of the root domains and its subdomains is now on its own IP address (e.g., example1.com and example2.com no longer resolve to the same IP address), the attack may follow the domain on its new IP address. Thus, by separating the domains and assigning each a separate IP address, the domain that is being attacked can be isolated. Flow then moves to operation 1225 where corrective action is taken.

While FIG. 12 describes an attack scenario, in one embodiment the secondary certificates can be used when moving a domain from one certificate to another certificate. A domain may be moved from one certificate to another certificate for a number of reasons. For example, the content of the domain may change thereby necessitating a certificate change (e.g., a domain whose content changes to adult content may be moved to a certificate that is bound with domains that also display adult content). As another example, the owner of the domain may change which may cause that domain to be grouped into another certificate.

Figure 13A:
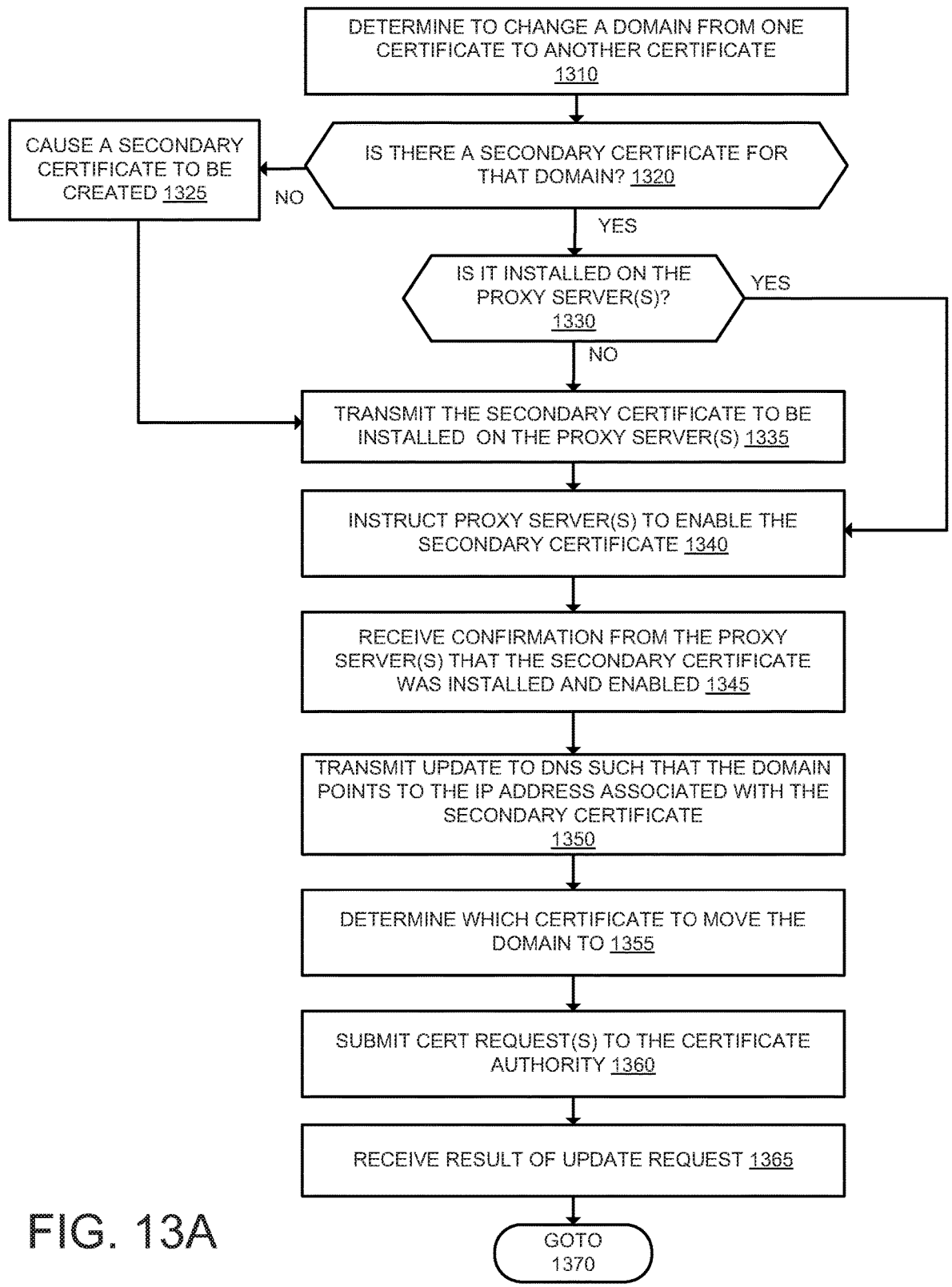
FIG. 13A is a flow diagram that illustrates part of exemplary operations for moving a domain from one certificate to another certificate in a cloud-based proxy service according to one embodiment.
Figure 13B:
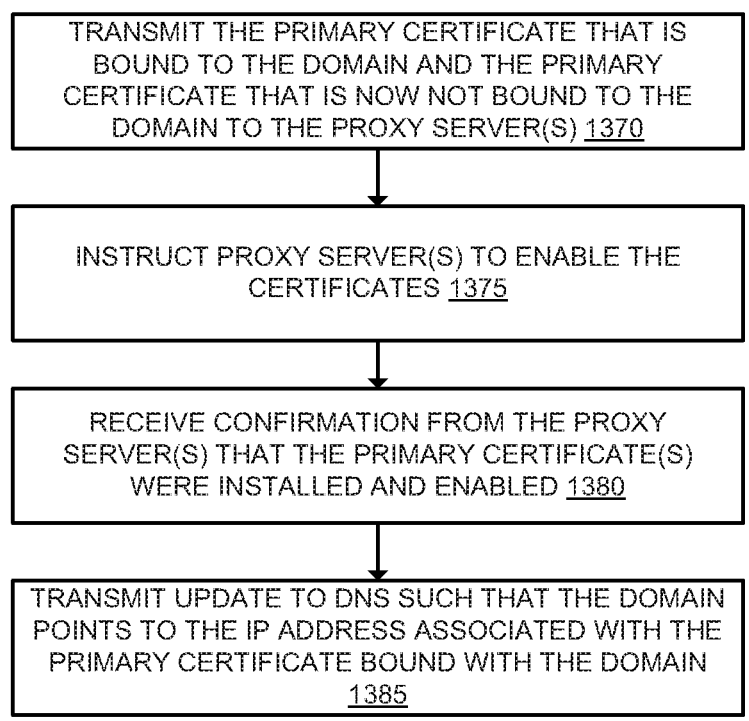
FIG. 13B is a flow diagram that illustrates part of the exemplary operations of FIG. 13A for moving a domain from one certificate to another certificate in a cloud-based proxy service according to one embodiment.

FIGS. 13A-B are flow diagrams that illustrate exemplary operations for moving a domain from one certificate to another certificate according to one embodiment. At operation 1310, the service server 125 determines to change a domain (either a root domain or a subdomain) from one certificate to another certificate. For purposes of this figure, the domain example1.com is to be changed to another certificate. The decision to change a domain to another certificate may result from a request from a domain owner, a re-categorization of the content of the domain, a change in domain ownership, for load balancing purposes, a result of the domain being blocked by a government or network provider, a change in the account type of the domain owner (e.g., a change to an account type that specifies the certificate is to be on its own dedicated IP address), or other reason.

Flow then moves to operation 1320 where the service server 125 determines whether a secondary certificate has been established for the domain. For example, the service server 125 accesses the certificate store 126 to determine whether a secondary certificate exists for example1.com. If a secondary certificate is not established for the domain, then flow moves to operation 1325 where the service server 125 causes a secondary certificate to be created. For example, the service server 125 submits a request to the Certificate Authority 128 for a certificate bound with the domain. The request may be for the root domain (e.g., example1.com) and a wildcard covering each subdomain of the root domain (e.g., *.example1.com). The Certificate Authority 128 may perform a validation procedure for the domain as previously described. Assuming that validation is successful, the Certificate Authority 128 transmits a certificate bound with the requested domains to the service server 125. The service server 125 then causes the secondary certificate to be installed in the certificate store 126. Flow then moves to operation 1335.

If a secondary certificate is established for that domain, then flow moves to operation 1330 where the service server 125 determines whether that secondary certificate is installed on the proxy server(s) in which the original primary certificate is installed and enabled. For example, the service server 125 determines whether the secondary certificate bound with example1.com, is installed on the proxy server(s) that have IP addresses associated with certificate A. If the secondary certificate is not installed, then flow moves to operation 1335, otherwise flow moves to operation 1340. At operation 1335, the service server 125 transmits the secondary certificate to be installed on at least those proxy server(s) in which the original primary certificate is installed and enabled and have not installed the secondary certificate. Next, flow moves to operation 1340.

At operation 1340, the service server 125 instructs the proxy server(s) to enable the secondary certificate for the domain. For example, the service server 125 transmits a message to the proxy server(s) indicating that it should enable the secondary certificates for example1.com. Enabling the secondary certificate includes the proxy server(s) associating each secondary certificate with a unique IP address (if not already associated) and updating their web server configuration accordingly to return the secondary certificate. For example, a proxy server updates its web server configuration such that when receiving an SSL or TLS client-hello message at an IP address uniquely associated with a secondary certificate, the proxy server will return that secondary certificate. Flow then moves to operation 1345.

At operation 1345, the service server 125 receives confirmation from the proxy server(s) that the secondary certificate was installed and enabled. The confirmation may also include the IP address(es) associated with the domain(s) bound in the secondary certificate. The service server 125 may update the certificate store 126 accordingly. For example, the service server 125 marks the secondary certificate as being installed and enabled on the proxy server(s).

Flow then moves to operation 1350 and the service server 125 transmits an update to the DNS system 140 such that the domain(s) bound in the secondary certificate resolves to the IP address(es) associated with the secondary certificate. Flow then moves to operation 1355 where the service server 125 determines which certificate to move the domain to. In one embodiment, the service server 125 performs one or more of the clustering procedures described in FIG. 3 when determining which certificate the domain should be moved to. By way of example, the service server 125 determines to move the domain example1.com from certificate A to certificate B. Next, flow moves to operation 1360 and the service server 125 transmits one or more update requests (e.g., a SAN update request) to the Certificate Authority 128 to remove the domain from its current certificate (e.g., remove example1.com from certificate A) and add that domain to another certificate (e.g., add example1.com to certificate B).

Flow moves from operation 1360 to operation 1365 where the service server 125 receives the result of the update request from the Certificate Authority 128. Assuming that the update request was successful, the service server 125 will receive a certificate with the domain removed (e.g., certificate A') and receive a certificate with the domain added (e.g., certificate B'). The service server 125 installs the digital certificates in the certificate store 126. Next, at operation 1370, the service server 125 transmits the certificates to be installed on one or more proxy servers. The service server 125 then instructs those proxy server(s) to enable the certificates at operation 1375. Enabling the certificates includes the proxy server(s) installing into their local certificate store 122, associating an IP address with each of the certificates (if one does not already exist), and updating their web server configuration accordingly. For example, the web server configuration is updated such that when receiving an SSL or TLS client-hello message at the IP address associated with certificate A' (which is bound with the domains example2.com and example3.com), certificate A' will be returned, and when receiving an SSL or TLS client-hello message at the IP address associated with certificate B' (which is bound with the domain example1.com and may also be bound with other domains), certificate B' will be returned. The proxy server(s) may also remove update their web server configuration to stop returning the secondary certificate for the domain example1.com. Flow moves from operation 1375 to operation 1380.

At operation 1380, the service server 125 receives confirmation from the proxy server(s) that the certificate(s) (e.g., certificates A' and B') were installed and enabled. The confirmation may also include the IP address(es) associated with the domain(s) bound in the certificates. The service server 125 may update the certificate store 126 accordingly. For example, the service server 125 marks the certificates as being installed and enabled on the proxy server(s).

Flow then moves to operation 1350 and the service server 125 transmits an update to the DNS system 140 such that the domain(s) moved to the other certificate resolve to the IP address(es) associated with that other certificate.

While FIG. 13 describes operations performed in a particular order, it should be understood that such order is exemplary and alternative embodiments may perform the operations in a different order, combine certain operations, overlap certain operations, etc. For example, the service server 125 may request the certificate updates from the Certificate Authority 128 to change a domain from one certificate to another prior or concurrently with instructing the proxy server(s) to enable the secondary certificate bound with that domain.

While FIG. 13 describes operations that use a secondary certificate as a temporary certificate, in other embodiments a secondary certificate is not used. For example, in one embodiment, responsive to determining to move a domain from a certificate to another certificate, the service server 125 transmits one or more update requests to the Certificate Authority 128 to remove the domain from its current certificate and add the domain to another certificate. The proxy server(s) continue to use the current certificates (the current certificate that is bound with the domain that is being removed and the current certificate that the domain is being added to) while the Certificate Authority 128 issues new certificates that reflect the changes. After the Certificate Authority 128 has issued new certificates that reflect the change, the service server 125 causes those new certificates to be installed and enabled at the proxy server(s). In addition, the DNS records are updated to reflect that the domain being moved.

While FIG. 13 describes operations performed when moving a domain from one certificate to another, similar operations are performed when removing a domain from one or more certificates. For example, responsive to determining to remove a domain from a certificate (e.g., the domain owner has indicated that they no longer require or want secure session capability), the service server 125 transmits an update request to the Certificate Authority 128 to remove that domain from the certificate. After the Certificate Authority 128 has issued a certificate that reflects the removal of the domain, the service server 125 causes the certificate to be installed and enabled at one or more proxy servers. In one embodiment, the proxy server(s) continue to use the current certificate that is still bound with the domain (if there are other domains also bound to that certificate) until receiving an updated version of the certificate where the domain is removed. In another embodiment, the proxy server(s) switch to secondary certificate(s) for each of the other domains in the certificate until receiving an updated version of the primary certificate where the domain is removed.

Host Header Override

In certain circumstances, a domain owner may have an application or other aspect of their website hosted by a data center or other third party. The data center may host the application or other aspect of the website at a subdomain of the data center or third party. For example, a hosting provider with a domain hostingprovider.com may host an application or other aspect of a customer's website at customerexample.hostingprovider.com. However, the customer may want it to appear that that the application is located at their custom domain (e.g., customerexample.com). The customer may do this by using a CNAME record in their DNS records to point their custom domain to the domain provided by the hosting provider.

In regards to secure session capability, many of these hosting providers create a wildcard certificate that is bound with each of the subdomains of the different customers (e.g., *.hostingprovider.com). If the secure session negotiation is initially requested by a client network application that does not support SNI and is for the custom domain (e.g., https://customerexample.com), the hosting provider's server will return the wildcard certificate, which may cause the client network application to display an error due to the domains being bound in the wildcard certificate (e.g., *.hostingprovider.com) not matching the requested domain (e.g., customerexample.com).

Hosting providers may make their routing decision based on the host name and may not recognize the custom domain. For example, the hosting provider origin server may include multiple virtual servers where the hostname is provided by the hosting provider (e.g., customerexample1.hostingprovider.com, customerexample2.hostingprovider.com, etc.), and may not recognize the custom domain (e.g., customerexample.com). As a result, when the hosting provider origin server receives a request (e.g., an HTTP request) that includes a hostname that does not correspond to one of its virtual servers or decrypts an encrypted request (e.g., an HTTPs request) and determines that the hostname does not correspond to one of its virtual servers, it may return an error message or redirect the visitor to a different page.

In some embodiments of the invention, a domain owner registers to have their Host header overridden by the proxy server for certain domains. For example, the service server 125 allows the domain owner to specify an alternative host header to support connecting to a specific origin server. By way of example, the domain owner of customerexample.com may specify an alternative domain (e.g., customerexample.hostingprovider.com) for the proxy server to insert in the Host header field responsive to receiving a request directed at the original Host header field. In some embodiments, the service server 125 may query the customer to specify an alternative Host header upon determining that the customer has a CNAME record to a domain of a hosting provider that commonly requires a subdomain that issued to be used.

The proxy server(s) are configured with the alternative Host header such that receiving a request directed to the original Host header filed, it changes the Host header to the alternative Host header and issues the request to the origin server.

The response from the hosting provider origin server may include a domain in the SetCookie header of the response. The domain is typically either the root domain of the hosting provider (e.g., hostingprovider.com) or the subdomain hosting the application or content (e.g., customerexample1.hostingprovider.com). However, since the original request from the client device is directed to the customer's custom domain (e.g., customerexample.com), the cookie will not be stored since the domains do not match. In one embodiment, responsive to receiving a response from an origin server that includes a domain set in the SetCookie header, the proxy server changes the domain to the customer's custom domain in the SetCookie header prior to transmitting that response to the requesting client device. In another embodiment, responsive to receiving a response from an origin server that includes a domain set in the SetCookie header, the proxy server removes the domain from the SetCookie header prior to transmitting that response to the requesting client device.

Figure 14:
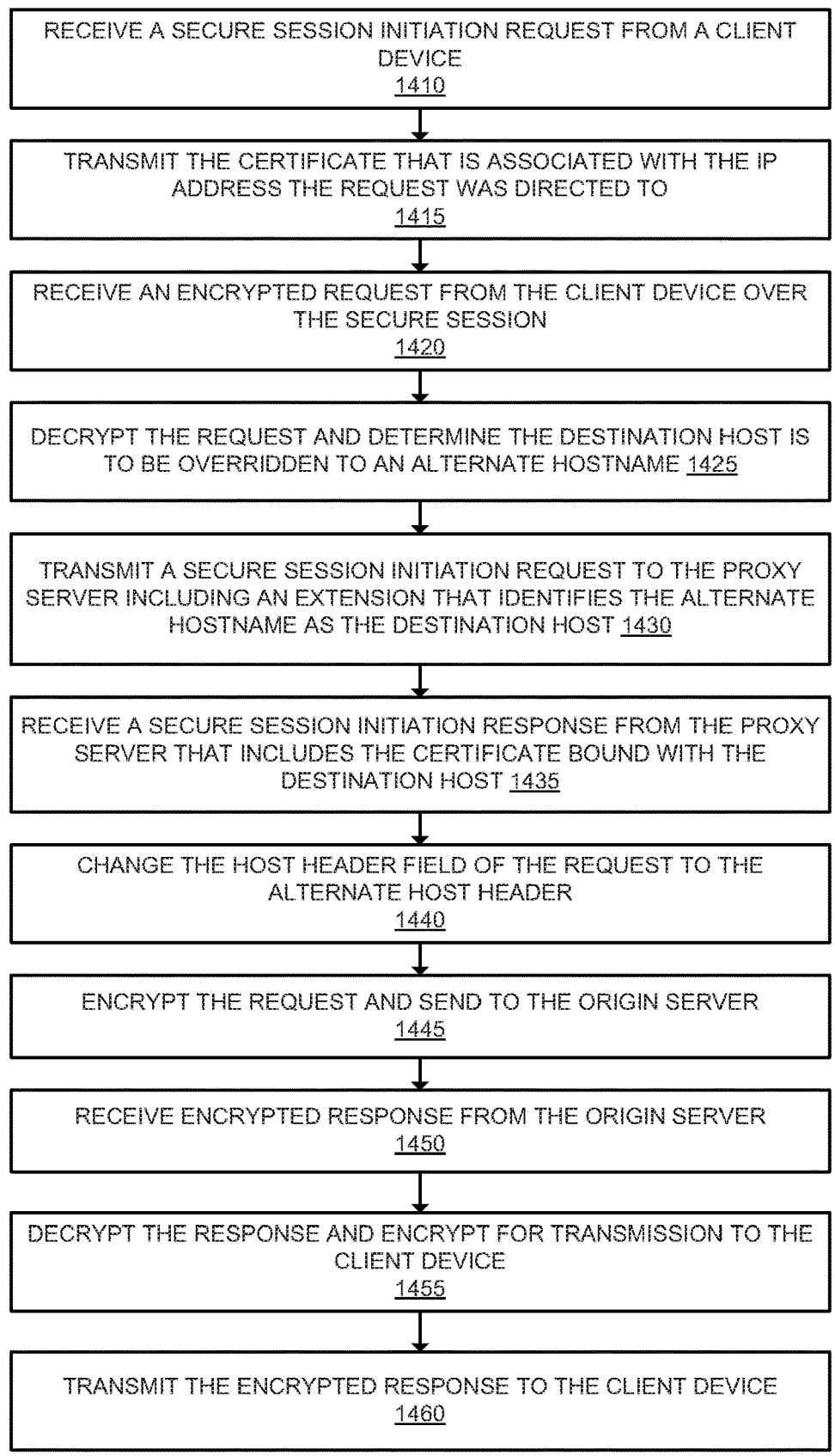
FIG. 14 illustrates exemplary operations for supporting secure sessions in a cloud-based proxy service with Host header field override according to one embodiment.

FIG. 14 illustrates exemplary operations for supporting secure sessions in a cloud-based proxy service with Host header field override according to one embodiment. At operation 1410, the proxy server 120 receives a secure session initiation request from a client device 110. The request may be received at the proxy server 120 as a result of DNS for the requested domain resolving to the proxy server 120. The secure initiation request may be an SSL client-hello message or may be a TLS client-hello message.

Next, at operation 1415, the proxy server 120 transmits to the client device 110 the certificate that is associated with the IP address that the secure initiation request was directed (e.g., in a TLS or SSL server-hello message). The proxy server 120 and the client device 110 also negotiate other parameters for the secure session (e.g., negotiate the cryptographic protocol for the encryption, establish session keys for the secure connection, etc.).

Next, at operation 1420, the proxy server 120 receives an encrypted request (e.g., an HTTPS request) from the client device 110 over the secure session. Flow then moves to operation 1425 and the proxy server 120 decrypts the request and determines that the destination host (e.g., by analyzing the Host header field of the request) is subject to being overridden to the alternate Host header field. For example, the proxy server 120 decrypts the request to determine that the hostname (as indicated in the Host header field) is customerexample.com, and determines that customerexample.com is to be overridden with customerexample.hostingprovider.com.

Flow then moves to operation 1430, and the proxy server 120 transmits a TLS client-hello message that includes an SNI extension field that identifies the alternate hostname (e.g., customerexample.hostingprovider.com) as the destination to the origin server 130. The origin server 130 retrieves the certificate bound to the destination host and at operation 1435, the proxy server 120 receives a TLS server-hello message with that certificate. The proxy server 120 and the origin server 130 also negotiate other TLS parameters at operation to establish the secure connection between the proxy server 120 and the origin server 130 (e.g., negotiate the cryptographic protocol for the encryption, establish session keys for the secure connection, etc.). Flow then moves to operation 1440.

At operation 1440, the proxy server 120 changes the Host header field of the request to the alternate host header. For example, the proxy server 120 changes the Host header to be customerexample.hostingprovider.com. Flow then moves to operation 1445 and the proxy server 120 encrypts the request and transmits the encrypted request (e.g., HTTPS) to the origin server 130. The origin server 130 will receive the encrypted request, decrypt the request, and determine that the destination host is hosted at the origin server 130 (e.g., one of the virtual servers). The request is then routed to that virtual server for processing. Thus, even though the original request is directed to a custom domain that would not be supported by the hosting provider, the proxy server overrides the Host header field in the original request to a subdomain provided by the hosting provider when transmitting the request to the hosting provider's origin server. The origin server then processes the request accordingly and prepares an encrypted response.

Flow then moves to operation 1450 and the proxy server 120 receives an encrypted response from the origin server 130. Next, the proxy server 120 decrypts the response and encrypts it for transmission to the client device 110 at operation 1455. In one embodiment, the proxy server 120 also caches the requested content such that future requests for that content may be served from its cache. Next, at operation 1460, the proxy server 120 transmits the encrypted response to the client device 110.

While FIG. 11 illustrates a secure session between the client device 110 and the proxy server 120 and a secure session between the proxy server 120 and the origin server 130, in some embodiments there is only a secure session between the client device 110 and the proxy server 120. In such embodiments, the proxy server 120 modifies the Host header of the request (e.g., after decrypting the request received in operation 1420) according to the Host header override value and transmits the request with the modified Host header to the origin server 130 unencrypted.

While embodiments have been described with reference to a third party Certificate Authority, in some embodiments the service acts as its own Certificate Authority and issues its own certificates. For example, in such embodiments, the service server 125 issues certificates for the connection 160. In such embodiments, since the customer is already validated during registration for the cloud-based proxy service, the service server 125 may not also need to validate the customer for secure session capability (thus the operations described with reference to FIG. 4 or 5 may not be performed).

In some embodiments, the proxy server 120 maintains a cache of content that it may serve to the requesting client devices. In such embodiments, responsive to decrypting the request (e.g., after operation 6 of FIG. 11), the proxy server 120 determines whether the requested resource is available in cache and has not expired. If it is, then the proxy server 120 can transmit the encrypted response with the requested content without establishing a session with the origin server 130 (either secure or otherwise) and requesting the content from the origin server 130.

While embodiments have been described with reference to a service server performing many of the operations including managing certificates, requesting/receiving certificates from the Certificate Authority, updating the DNS records, etc., embodiments are not so limited. For example, in some embodiments, a proxy server performs one or more of these operations directly.

Figure 15:
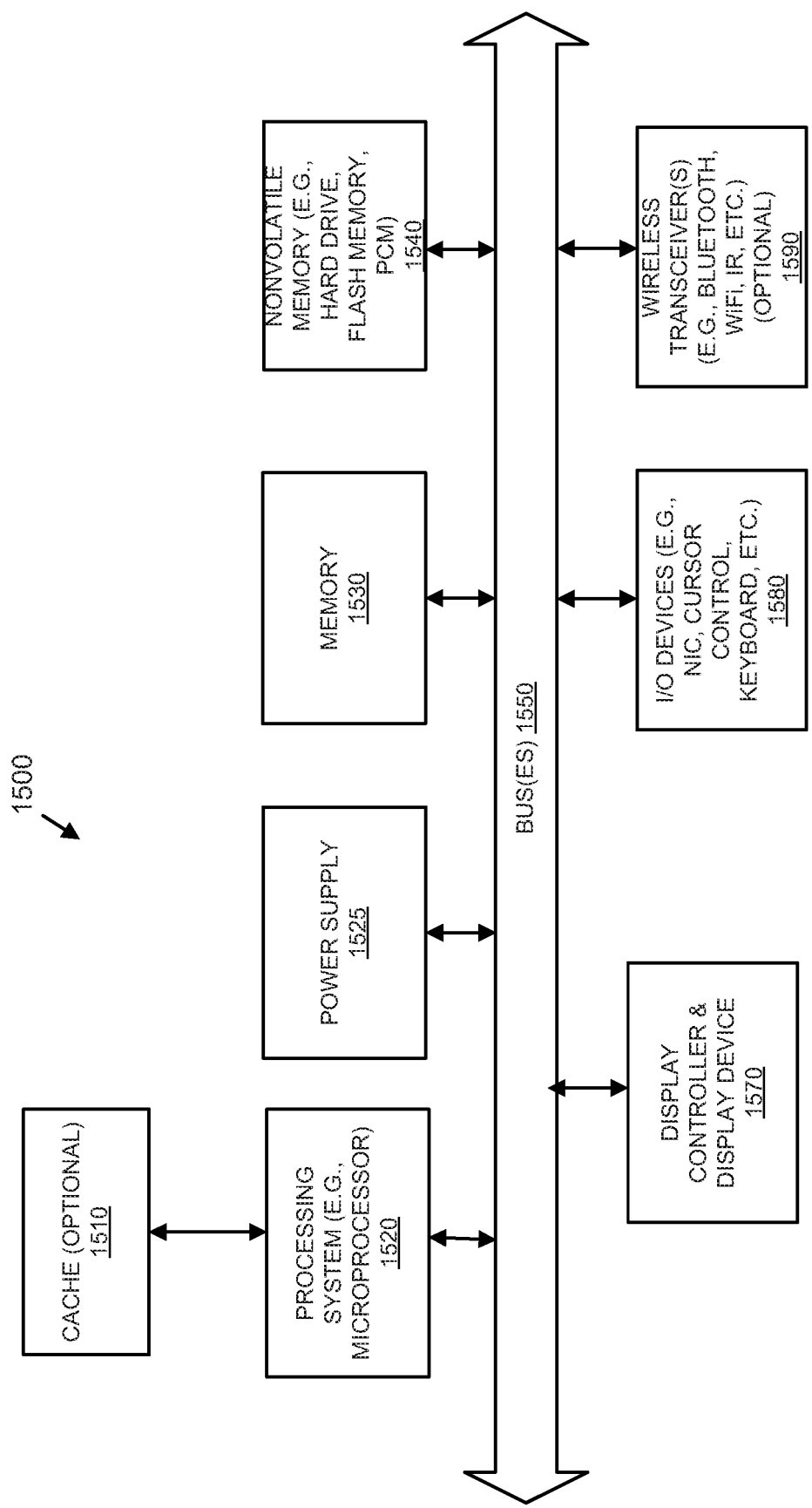
FIG. 15 is a block diagram illustrating an exemplary computer system used in accordance with one embodiment.

As illustrated in FIG. 15, the computer system 1500, which is a form of a data processing system, includes the bus(es) 1550 which is coupled with the processing system 1520, power supply 1525, memory 1530, and the nonvolatile memory 1540 (e.g., a hard drive, flash memory, Phase-Change Memory (PCM), etc.). The bus(es) 1550 may be connected to each other through various bridges, controllers, and/or adapters as is well known in the art. The processing system 1520 may retrieve instruction(s) from the memory 1530 and/or the nonvolatile memory 1540, and execute the instructions to perform operations described herein. The bus 1550 interconnects the above components together and also interconnects those components to the display controller & display device 1570, Input/Output devices 1580 (e.g., NIC (Network Interface Card), a cursor control (e.g., mouse, touchscreen, touchpad, etc.), a keyboard, etc.), and the wireless transceiver(s) 1590 (e.g., Bluetooth, WiFi, Infrared, etc.). One or more of the components of the computer system 1500 may be optional (e.g., the display controller and display device 1570, I/O devices 1580, the wireless transceiver(s) 1590, etc.). In one embodiment, the client devices 110A-I, the service server 125, the proxy server 120, and/or the origin servers 130A-L can take the form of the computer system 2700.

The techniques shown in the figures can be implemented using code and data stored and executed on one or more electronic devices (e.g., a client device, a proxy server, an origin server, a service server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a server, the method comprising:
   receiving a first request to establish secure session capability for a first set of one or more domains;
   creating a first set of one or more entries for inclusion in a Subject Alternate Name (SAN) extension of a certificate;
   determining that there is a first certificate that is bound to a first domain that has a same first root domain as the first set of domains;
   responsive to the determining that there is a first certificate that is bound to the first domain that has the same first root domain as the first set of domains, determining that the first certificate supports adding the first set of entries; and
   responsive to the determining that the first certificate supports adding the first set of entries, performing the following:
      submitting, to a certificate authority, a first certificate update request for adding the first set of entries to the first certificate,
      receiving an updated first certificate that includes the first set of domains in a first SAN extension of the first certificate, and
      causing the first certificate to be installed.

2. The method of claim 1, further comprising:
   receiving a second request to establish secure session capability for a second set of one or more domains;
   creating a second set of one or more entries for inclusion in a SAN extension of a certificate;
   defeminizing whether one or more network resources corresponding to the second set of domains have content in a predefined category of content; and
   responsive to the determining that there is a second certificate that is bound to a third set of domains, which can support adding the second set of entries, and wherein network resources of the third set of domains correspond to the predefined category of content, performing the following:
      submitting, to the certificate authority, a second certificate update request for adding the second set of entries to the second certificate,
      receiving an updated second certificate that includes the second set of domains in a second SAN extension of the second certificate, and
      causing the second certificate to be installed.

3. The method of claim 2, further comprising:
   responsive to the determining that there is no second certificate that is bound to a third set of domains, which can support adding the second set of entries, and wherein network resources of the third set of domains correspond to the predefined category of content, performing the following:
      submitting, to the certificate authority, a third certificate update request for adding the second set of entries to a third certificate, wherein the third certificate is bound to a small number of domains,
      receiving an updated third certificate that includes the second set of domains in a third SAN extension of the third certificate, and
      causing the third certificate to be installed.

4. The method of claim 1, further comprising:
   receiving a third request to establish secure session capability for a third set of one or more domains;
   creating a third set of one or more entries for inclusion in a SAN extension of a certificate;
   determining that there is no certificate that is bound to a domain that has a same third root domain as the third set of domains;
   responsive to the determining that there is no certificate that is bound to a domain that has a same third root domain as the third set of domains, determining whether an owner of the third set of domains has another domain that is bound to a fourth certificate; and
   responsive to the determining that the owner of the third set of domains has another domain that is bound to a fourth certificate and that the fourth certificate supports adding the third set of entries, performing the following:
      submitting, to the certificate authority, a fourth certificate update request for adding the third set of entries to the fourth certificate,
      receiving an updated fourth certificate that includes the third set of domains in a fourth SAN extension of the fourth certificate, and
      causing the fourth certificate to be installed.

5. The method of claim 1, wherein responsive to the determining that the first certificate supports adding the first set of entries, the method further comprises:
   incrementing, based on the number of entries in the first set of entries, a counter indicating the number of domains and subdomains that are bound to the first certificate.

6. The method of claim 1, wherein the first set of domains includes the first root domain, and wherein the creating the first set of entries for inclusion in a SAN extension of a certificate includes:
   creating a first entry for the first root domain; and
   creating a second entry for a wildcard that covers all subdomains of the first root domain.

7. The method of claim 1, wherein the first set of domains includes a plurality of qualified domain names (FQDNs), and wherein the creating the first set of entries for inclusion in a SAN extension of a certificate includes creating an entry for each one of the FQDNs.

8. A server comprising:
   a set of one or more processors;
   a set of one or more non-transitory computer-readable storage mediums storing instructions, that when executed by the set of processors, cause the set of processors to perform the following operations:
      receiving a first request to establish secure session capability for a first set of one or more domains;
      creating a first set of one or more entries for inclusion in a Subject Alternate Name (SAN) extension of a certificate;

determining whether there is a first certificate that is bound to a first domain that has a same first root domain as the first set of domains;

responsive to the determining that there is a first certificate that is bound to a first domain that has the same first root domain as the first set of domains, determining that the first certificate supports adding the first set of entries;

responsive to the determining that the first certificate supports adding the first set of entries, performing the following:

submitting, to a certificate authority, a first certificate update request for adding the first set of entries to the first certificate, receiving an updated first certificate that includes the first set of domains in a first SAN extension of the first certificate, and causing the first certificate to be installed; and responsive to the determining that there is no certificate that is bound to a first domain that has the same first root domain as the first set of domains, determining whether an owner of the first set of domains has another domain that is bound to a second certificate;

responsive to the determining that the owner of the first set of domains has another domain that is bound to a second certificate and that the second certificate supports adding the first set of entries, performing the following:

submitting, to the certificate authority, a second certificate update request for adding the first set of entries to the second certificate, receiving an updated second certificate that includes the first set of domains in a second SAN extension of the second certificate, and causing the second certificate to be installed.

9. The server of claim 8, wherein the operations further comprise:

receiving a second request to establish secure session capability for a second set of one or more domains;

creating a second set of one or more entries for inclusion in a SAN extension of a certificate;

determinizing whether one or more network resources corresponding to the second set of domains have content in a predefined category of content; and responsive to the determining that there is a third certificate that is bound to a third set of domains, which can support adding the second set of entries, and wherein network resources of the third set of domains correspond to the predefined category of content, performing the following:

submitting, to the certificate authority, a third certificate update request for adding the second set of entries to the second certificate, receiving an updated third certificate that includes the second set of domains in a third SAN extension of the third certificate, and causing the third certificate to be installed.

10. The server of claim 9, wherein the operations further comprise:

responsive to the determining that there is no third certificate that is bound to a third set of domains, which can support adding the second set of entries, and wherein network resources of the third set of domains correspond to the predefined category of content, performing the following:

submitting, to the certificate authority, a fourth certificate update request for adding the second set of entries to a fourth certificate, wherein the fourth certificate is bound to a small number of domains, receiving an updated fourth certificate that includes the second set of domains in a fourth SAN extension of the fourth certificate, and causing the third certificate to be installed.

11. The server of claim 8, wherein the operations further comprise:

responsive to the determining that the first certificate supports adding the first set of entries:

incrementing, based on the number of entries in the first set of entries, a counter indicating the number of domains and subdomains that are bound to the first certificate.

12. The server of claim 8, wherein the first set of domains includes the first root domain, and wherein the creating the first set of entries for inclusion in a SAN extension of a certificate includes:

creating a first entry for the first root domain; and creating a second entry for a wildcard that covers all subdomains of the first root domain.

13. The server of claim 8, wherein the first set of domains includes a plurality of qualified domain names (FQDNs), and wherein the creating the first set of entries for inclusion in a SAN extension of a certificate includes creating an entry for each one of the FQDNs.

14. A non-transitory computer-readable storage medium that provides instructions that, when executed by a processor, causes said processor to perform operations comprising:

receiving a first request to establish secure session capability for a first set of one or more domains;

creating a first set of one or more entries for inclusion in a Subject Alternate Name (SAN) extension of a certificate;

determining whether there is a first certificate that is bound to a first domain that has a same first root domain as the first set of domains; and responsive to the determining that there is a first certificate that is bound to the first domain that has the same first root domain as the first set of domains, determining that the first certificate supports adding the first set of entries;

responsive to the determining that the first certificate supports adding the first set of entries, performing the following:

submitting, to a certificate authority, a first certificate update request for adding the first set of entries to the first certificate, receiving an updated first certificate that includes the first set of domains in a first SAN extension of the first certificate, and causing the first certificate to be installed; and responsive to the determining that there is no certificate that is bound to the first domain that has the same first root domain as the first set of domains, determining whether an owner of the first set of domains has another domain that is bound to a second certificate;

responsive to the determining that the owner of the first set of domains has another domain that is bound to a second certificate and that the second certificate supports adding the first set of entries, performing the following:

submitting, to the certificate authority, a second certificate update request for adding the first set of entries to the second certificate, receiving an updated second certificate that includes the first set of domains in a second SAN extension of the second certificate, and causing the second certificate to be installed.

15. The non-transitory computer-readable storage medium of claim 14, wherein the operations further comprise:

receiving a second request to establish secure session capability for a second set of one or more domains;

creating a second set of one or more entries for inclusion in a SAN extension of a certificate;

determinizing whether one or more network resources corresponding to the second set of domains have content in a predefined category of content; and responsive to the determining that there is a third certificate that is bound to a third set of domains, which can support adding the second set of entries, and wherein network resources of the third set of domains correspond to the predefined category of content, performing the following:

submitting, to the certificate authority, a third certificate update request for adding the second set of entries to the second certificate, receiving an updated third certificate that includes the second set of domains in a third SAN extension of the third certificate, and causing the third certificate to be installed.

16. The non-transitory computer-readable storage medium of claim 15, wherein the operations further comprise:

responsive to the determining that there is no third certificate that is bound to a third set of domains, which can support adding the second set of entries, and wherein network resources of the third set of domains correspond to the predefined category of content, performing the following:

submitting, to the certificate authority, a fourth certificate update request for adding the second set of entries to a fourth certificate, wherein the fourth certificate is bound to a small number of domains, receiving an updated fourth certificate that includes the second set of domains in a fourth SAN extension of the fourth certificate, and causing the third certificate to be installed.

17. The non-transitory computer-readable storage medium of claim 14, wherein responsive to the determining that the first certificate supports adding the first set of entries, and wherein the operations further comprise:

incrementing, based on the number of entries in the first set of entries, a counter indicating the number of domains and subdomains that are bound to the first certificate.

18. The non-transitory computer-readable storage medium of claim 14, wherein the first set of domains includes the first root domain, and wherein the creating the first set of entries for inclusion in a SAN extension of a certificate includes:

creating a first entry for the first root domain; and creating a second entry for a wildcard that covers all subdomains of the first root domain.

19. The non-transitory computer-readable storage medium of claim 14, wherein the first set of domains includes a plurality of qualified domain names (FQDNs), and wherein the creating the first set of entries for inclusion in a SAN extension of a certificate includes creating an entry for each one of the FQDNs.

* * * * *